US010545482B2

(12) United States Patent
Dash et al.

(10) Patent No.: US 10,545,482 B2
(45) Date of Patent: Jan. 28, 2020

(54) ROBUST CONTROL DESIGN APPROACH FOR CHEMICAL PROCESSING INDUSTRIES AND OTHER INDUSTRIES

(71) Applicant: Honeywell International Inc., Morristown, NJ (US)

(72) Inventors: Sachindra K. Dash, Scottsdale, AZ (US); Konstantinos Tsakalis, Chandler, AZ (US); J. Ward MacArthur, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 663 days.

(21) Appl. No.: 14/740,396

(22) Filed: Jun. 16, 2015

(65) Prior Publication Data
US 2016/0026171 A1 Jan. 28, 2016

Related U.S. Application Data

(60) Provisional application No. 62/028,155, filed on Jul. 23, 2014.

(51) Int. Cl.
*G05B 19/408* (2006.01)
(52) U.S. Cl.
CPC .. *G05B 19/408* (2013.01); *G05B 2219/32287* (2013.01)
(58) Field of Classification Search
CPC ...... G05B 19/408; G05B 17/02; G05B 13/04; G05B 2219/32287
See application file for complete search history.

(56) References Cited

U.S. PATENT DOCUMENTS

| 5,610,843 | A  | 3/1997 | Chou |
| 5,841,909 | A  | 11/1998 | Yokoyama |
| 6,026,332 | A  | 2/2000 | Kenknight et al. |
| 2006/0119783 | A1 | 6/2006 | Fukuoka et al. |
| 2008/0183311 | A1 | 7/2008 | MacArthur et al. |
| 2009/0018671 | A1 | 1/2009 | Srinivasan et al. |
| 2009/0265021 | A1 | 10/2009 | Dubay et al. |
| 2012/0323367 | A1 | 12/2012 | MacArthur et al. |

FOREIGN PATENT DOCUMENTS

JP 2013012249 A 1/2013

OTHER PUBLICATIONS

Tufa, et al.; "Development of Box-Jenkins type time series models by combining conventional and orthonormal basis filter approaches"; Journal of Process Control; 2010; 13 pages.
Gomez, et al.; "Identification of block-oriented nonlinear systems using orthonormal bases"; Journal of Process Control; 2004; pp. 685-697.

(Continued)

*Primary Examiner* — Shogo Sasaki

(57) ABSTRACT

A method includes obtaining a process model representing an industrial process and obtaining controller specifications for an industrial process controller. The method also includes identifying a controller design having one or more parameters for the industrial process controller using the process model, an uncertainty associated with the process model, and the one or more parameters. The method further includes validating the controller design of the industrial process controller for use in a closed-loop control system and deploying the controller design if validated to the industrial process controller.

17 Claims, 11 Drawing Sheets

(56) References Cited

OTHER PUBLICATIONS

Gomez, et al.; "Identification of Nonlinear Systems using Orthonormal Bases"; Laboratory for System Dynamics FCEIA, Universidad Nacional de Rosario; Mar. 2003; 14 pages.

Er-Wei Bai, "Identification of an Additive NFIR System and its applications in generalized Hammerstein models" 44th IEEE Conference on Decision and Control and the European Control Conference 2005; Dec. 12-15, 2005; pp. 6406-6411.

Chan, et al.; "Identification of MIMO Hammerstein systems using cardinal spline functions"; Journal of Process Control; 2006; 12 pages.

Renfro, et al.; "Simultaneous Optimization and Solution of Systems Described by Differential/Algebraic Equations";Comput.chem. Engng, vol. 11. No. 5; 1987; pp. 503-517.

Baumrucker, et al; "MPEC Problem Formulations in Chemical Engineering Applications" National Science Foundation; Jun. 16, 2007; 28 pages.

Balakrishnan et al; "Neurocontrol: A Literature Survey"; Mathl. Comput. Modeling vol. 23, No. 1/2; 1996; pp. 101-117.

Thomas H. Kerr; "Critique of Some Neural Network Architectures and Claims for Control and Estimation" IEEE Transactions on Aerospace and Electronic Systems; vol. 34, No. 2 Apr. 1998; pp. 406-419.

Zilkova, et al.; "Nonlinear System Control Using Neural Networks"; Acta Polytechnica Hungarica, vol. 3 No. 4; 2006; pp. 85-94.

Ruanne Delport; "Process Identification Using Second Order Volterra Models for Nonlinear Model Predictive Control Design of Flotation Circuits" University of Pretoria etd; Dec. 2, 2004; 161 pages.

Ling, et al.; "Control Relevant Model Reduction of Volterra Series Models"; Dept of Chemical, Bio, and Materials Engineering; Sep. 4, 1996; 22 pages.

Li, et al.; High-Order Volterra Model Predictive Control and Its Application to a Nonlinear Polymerisation Process; International Journal of Automation and Computing 2; 2005; pp. 208-214.

Eskinat, et al.; "Use of Hammerstein Models in Identification of Nonlinear Systems" AIChE Journal, vol. 37, No. 2; Feb. 1991; pp. 255-268.

Totterman, et al.; "Support vector method for identification of Wiener models"; Journal of Process Control; 2009; pp. 1174-1181.

Wang, et al.; "Least squares based and gradient based iterative identification for Wiener nonlinear systems"; Signal Processing; 2001; pp. 1182-1189.

Yucai Zhu; "Estimation of an N-L-N Hammerstein-Wiener model"; Automatica 38; 2002; pp. 1607-1612.

Bo Wahlberg; "System Identification Using Laguerre Models"; IEEE Transactions on Automatic Control vol. 36, No. 5; May 1991; pp. 551-562.

William H. Kautz; "Network Synthesis for Specified Transient Response" Technical Report No. 209, Research Laboratory of Electronics, Apr. 23, 1952; 183 pages.

Bo Wahlberg; "System Identification Using Kautz Models" IEEE Transactions on Automatic Control, vol. 39, No. 6; Jun. 1994; pp. 1276-1282.

Juan Carlos Gomez; "Analysis of Dynamic System Identification using Rational Orthonormal Bases" Dept of Electrical and Computer Engineering, The University of Newcastle New South Wales, Australia, Feb. 1998; 209 pages.

Ninness, et al; "A Unifying Construction of Orthonormal Bases for System Identification"; Proceedings of the 33rd Conference on Decision and Control; Lake Buena Vista, FL; Dec. 1994; pp. 3388-3393.

Qin, et al; "A survey of industrial model predictive control technology"; Control Engineering Practice 11; 2003; pp. 733-764.

Lind, et al; "Regressor and Structure Selection in NARX Models Using a Structured ANOVA Approach"; Division of Automatic Control, Dept of Electrical Engineering, Linkoping, Sweden; Jun. 12, 2007; 13 pages.

Jacobsen, et al.; "Multiple Steady States in Ideal Two-Product Distillation" Chemical Engineering Norwegian Institute of Technology (NTH); Norway; Nov. 1990; 33 pages.

Abonyi, et al.; "Identification and control of Nonliner Systems Using Fuzzy Hammerstein Models" Industrial & Engineering Chemistry Research; 2000; pp. 4302-4314.

Dempsey, et al.; "Identification of Hammerstein Models with Cubic Spline Nonlinearities"; IEEE Transaction on Biomedical Engineering; vol. 51, No. 2.; Feb. 2004; pp. 237-245.

Neuberger, et al.; "A Generalized Orthonormal Basis for Linear Dynamical Systems"; IEEE Transactions on Automatic Control; vol. 40, No. 3; Mar. 1995; pp. 451-465.

Toth, et al.; "Identification of nonlinear process models in an LPV framework"; Proc. of the 9th International Symp. on Dynamics and Control; Jul. 5-7, 2010; pp. 869-874.

Toth, et al.; "An LPV identification Framework Based on Orthonormal Basis Functions"; Proc. of the 15th IFAC Symposium Identification; Jul. 6-8, 2009; pp. 1328-1333.

Vodencarevic, et al.; "Identifying Behavior Models for Process Plants"; IEEE ETFA; 2011; 8 pages.

Juan C. Gomez; "Identification of Nonlinear Systems using Orthonormal Bases"; Proc. IASTED International Conference on Intelligent Systems and Control; 2001; 18 pages.

International Search Report dated Oct. 19, 2015 in connection with International Patent Application No. PCT/US2015/040106; 5 pages.

International Written Opinion dated Oct. 19, 2015 in connection with International Patent Application No. PCT/US2015/040106; 6 pages.

Lennart Ljung; "System identification theory for the user"; Automatica 38; 2002; pp. 375-378.

Zhan, et al.; "System Identification for robust Control"; IEEE; Proceedings of the 2007 American Control Conference; 2007; pp. 846-851.

Alvarez, et al.; "pH Neutralization Process as a Benchmark for Testing Nonlinear Controllers"; Ind. Eng. Chem. Res. vol. 40; 2001; pp. 2467-2473.

Grassi, et al.; "Integrated System identification and PID Controller Tuning by Frequency Loop-Shaping"; IEEE Transaction on Control Systems Tech, vol. 9, No. 2. Mar. 2001; 10pg.

Rivera, et al.; "Internal Model Control. 4 PID Controller Design"; Ind. Eng. Chem. Procee Des. Dev.; 1986; pp. 252-265.

Henson, et al.; "Adaptive Nonlinear Control of a pH Neutralization Process"; IEEE Transactions on Control Systems Technology, vol. 2, No. 3, Aug. 1994; pp. 169-182.

J. Ward MacArthur; "A new approach for nonlinear process identification using orthonormal bases and ordinal splines"; Journal of Process Control 22; 2012; pp. 375-389.

Tsakalis, et al.; "Approximate H loop shaping in PID parameter adaptation" International Journal of Adaptive Control and Signal Processing 2013; pp. 136-152.

Astrom, et al.; "PID Controllers, 2nd Edition" 1995; 350 pages.

Doyle, et al.; "Feedback Control Theory"; Macmillan Publishing Co., 1990; 219 pages.

Joshi, et al.; "Account for Uncertainty with Robust Control Design"; Part 1; Chemical Engineering Process (CEP), Nov. 2014; 38 pages.

Joshi, et al.; "Account for Uncertainty with Robust Control Design"; Part 2; Chemical Engineering Process (CEP), Dec. 2014; 50 pages.

Joshi, et al.; "Robust PID Control in Chemical Process Industries"; repository.asu.edu/attachments/144322/content/Joshi_Tsakalis_CEP. pdf; Nov. 1, 2014; 29 pages.

Patwardhan, et al.; "From data to diagnosis and control using generalized orthonormal basis filters. Part II: Model predictive and fault tolerant control", Journal of Process Control, vol. 16, Issue 2, Dept of Chemical Engineering, Indian Institute of Technology, Bombay, Powai, Mumbai India, Feb. 2006, pp. 157-175.

Patwardhan, et al.; "From data to diagnosis and control using generalized orthonormal basis filters. Part I: Development of state observers", Journal of Process Control, vol. 15, Issue 7, Dept of Chemical Engineering, Indian Institute of Technology, Bombay, Powai, Mumbai India, Oct. 2005, pp. 819-835.

US 10,545,482 B2

ROBUST CONTROL DESIGN APPROACH FOR CHEMICAL PROCESSING INDUSTRIES AND OTHER INDUSTRIES

CROSS-REFERENCE TO RELATED APPLICATION AND PRIORITY CLAIM

This application claims priority under 35 U.S.C. § 119(e) to U.S. Provisional Patent Application No. 62/028,155 filed on Jul. 23, 2014, which is hereby incorporated by reference in its entirety.

TECHNICAL FIELD

This disclosure relates generally to industrial process control and automation systems. More specifically, this disclosure relates to a robust control design approach for chemical processing industries and other industries.

BACKGROUND

Processing facilities are often managed using industrial process control and automation systems. These types of systems routinely include sensors, actuators, and process controllers. Some of the process controllers typically receive measurements from the sensors and generate control signals for the actuators. When tuning a process controller for industrial use, it is often necessary or desirable to find tuning parameters that ensure good performance of the process controller. This problem falls into the discipline of "control theory" and the practice known as "robust control." Standard robust control techniques have been used to successfully tune process controllers in a variety of industries.

SUMMARY

This disclosure provides a robust control design approach for chemical processing industries and other industries.

In a first embodiment, a method includes obtaining a process model representing an industrial process and obtaining controller specifications for an industrial process controller. The method also includes identifying a controller design having one or more parameters for the industrial process controller using the process model, an uncertainty associated with the process model, and the one or more parameters. The method further includes validating the controller design of the industrial process controller for use in a closed-loop control system and deploying the controller design if validated to the industrial process controller.

In a second embodiment, an apparatus includes at least one memory configured to store a process model representing an industrial process. The apparatus also includes at least one processing device configured to (i) obtain controller specifications for an industrial process controller, (ii) identify a controller design having one or more parameters for the industrial process controller using the process model, an uncertainty associated with the process model, and the one or more parameters, (iii) validate the controller design of the industrial process controller for use in a closed-loop control system, and (iv) deploy the controller design if validated to the industrial process controller.

In a third embodiment, a non-transitory computer readable medium contains instructions. The instructions when executed cause at least one processing device to (i) obtain a process model representing an industrial process, (ii) obtain controller specifications for an industrial process controller, (iii) identify a controller design having one or more parameters for the industrial process controller using the process model, an uncertainty associated with the process model, and the one or more parameters, (iv) validate the controller design of the industrial process controller for use in a closed-loop control system, and (v) deploy the controller design if validated to the industrial process controller.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 20, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
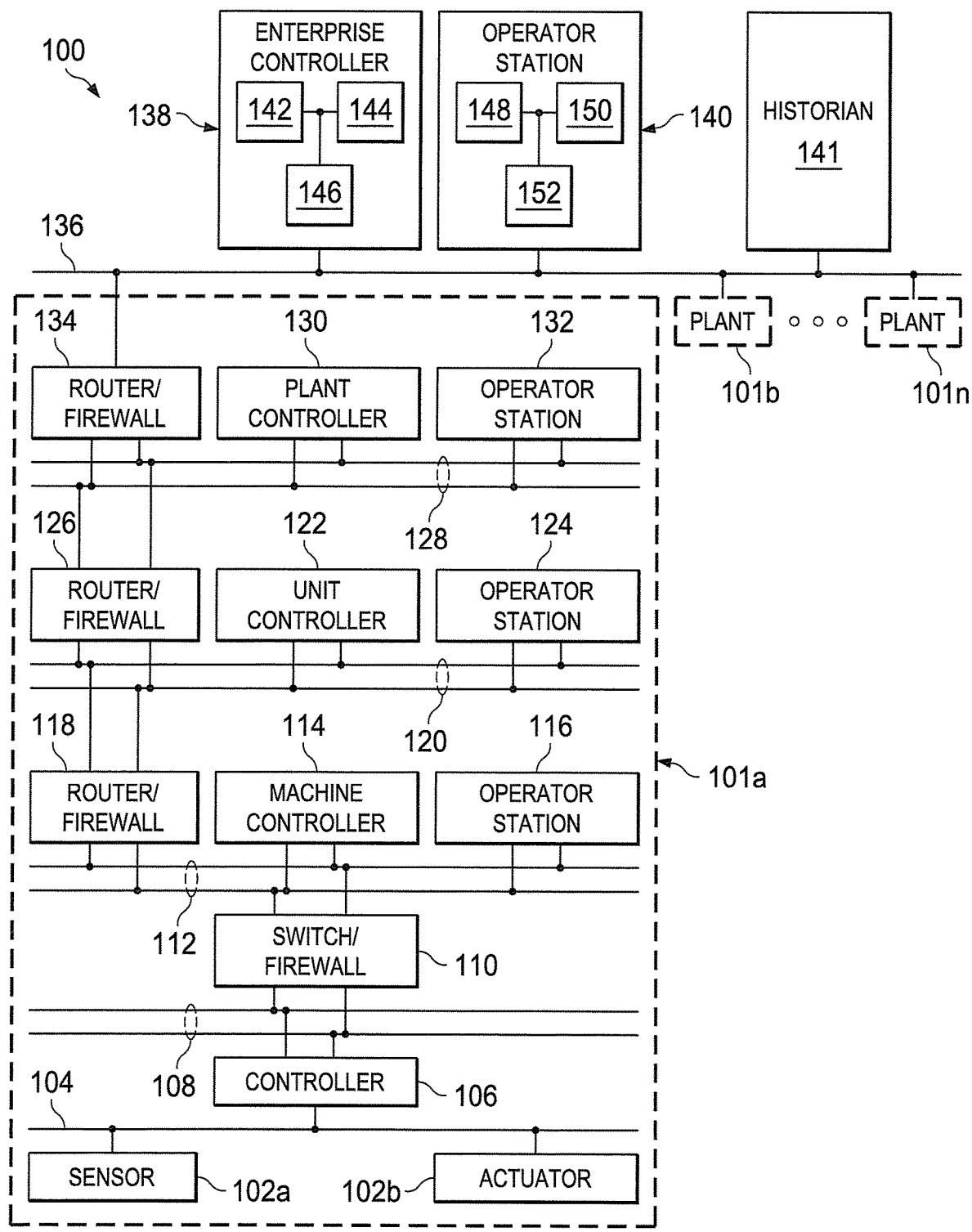
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a microcontroller, a proportional-integral-derivative (PID) controller, or a multivariable controller, such as a Robust Multivariable Predictive Control Technology (RM-PCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of to the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 to could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers. Each processing device 142, 148 includes any suitable computing or processing device, such as a microprocessor, microcontroller, digital signal processor, application specific integrated circuit, field programmable gate array, or discrete logic devices. Each memory 144, 150 includes any suitable volatile or non-volatile storage and retrieval device, such as a random access memory (RAM) or Flash memory. Each interface 146, 152 includes any suitable structure supporting communications over one or more communication paths.

Robust control design has been increasingly used in industrial settings by various automation companies. Design procedures have evolved over time and are now often fully automated for use by practicing engineers or even operators. One does not need to be familiar with the details of the underlying control theory to use the design procedure in a particular industrial setting.

This patent document describes a robust control design approach for engineers, operators, or other personnel. The details of the robust control design approach are provided below. This approach could be used to design process controllers for use in the system 100 or in any other suitable industrial process control and automation system. In some embodiments, this approach can be used to design multivariable controllers, PID controllers, microcontrollers, or other types of process controllers. Note that while described below as being used to design microcontrollers, PID, or multivariable controllers (typically at "Level 2" of a system), controllers at any other suitable level of an industrial process control and automation system could be designed using the approach described in this patent document.

In some parts of the following description, the robust control design approach is described as being used by practicing chemical engineers in a chemical industrial facility. A classical pH control problem is used as an example, which is a challenging problem due to its non-linearity. As described in more detail below, a pH process is analyzed, and limitations of linear control design are identified in terms of model uncertainty and sensor sampling constraints. A controller is designed following the guidelines from robust control theory, and the results are demonstrated through implementation in a lab-scale wastewater system. The experimental results show the validity of the process model and the control design approach, as well as point out the limitations of linear controller performance. Note, however, that the robust control design approach can be used by any suitable personnel and in any suitable environment. The robust control design approach described in this patent document could be used in a wide variety of industries to solve a wide variety of control problems.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the robust control design approach can be used. This functionality can be used in any other suitable device or system.

Overall Robust Control Design Approach

Chemical processes routinely present challenges for traditional control strategies since many chemical processes involve nonlinearities, time delays, and unknown process parameters (such as heat-transfer coefficients, reaction rate constants, and enthalpies of reaction). Robust control has emerged as a way to design control systems that can handle these complexities. Unlike conventional control designs, robust control accounts for uncertainties in the models used to design process controllers. Accounting for these uncertainties enables the design of a control system that maintains stability and achieves specified performance under a wide range of operating conditions.

This section describes the basics of robust control, outlines the steps involved in robust control design, and illustrates a method with an example involving a first-principles model. Remaining sections of this patent document expand on this by providing an example of robust control design in which a process is modeled based on experimental data and by offering potential solutions to overcome some of the deficiencies of linear controllers.

Control theory provides a solid foundation for designing process controllers for use in chemical processing industries (CPI) and other industries. One goal of control theory is the design of a process controller that senses the behavior of an industrial process, compares the sensed behavior to desired behavior, computes corrective actions based on a model of the industrial process, and prompts the industrial process to take the corrective action. In designing these process controllers, it is often necessary or desirable to ensure that the behavior of a closed-loop control system is stable and that desired closed-loop specifications are satisfied. Such specifications can include, for example, the speed of a response as expressed by a time constant (such as the time for a step response to reach 63% of its final value) and the allowable oscillatory behavior as expressed by a percent overshoot.

Many process control design methods use a linear nominal model of an industrial process. Some techniques rely on frequency-domain analysis, although some more recent methods can be used to formulate time- and frequency-domain specifications as optimization problems. Controller specifications can be translated into closed-loop bandwidth (roughly the inverse of the closed-loop time constant) and the peak of the closed-loop frequency response.

Many times, the estimated response of an industrial process (estimated using a nominal model of the process) can deviate from the actual response of the process. The nominal model response can deviate from the actual response for a variety of reasons, including the presence of nonlinearity, noise, and dynamics not accounted for by a model. The difference between the nominal model response and the response of the actual process is referred to as uncertainty. Robust control theory helps to design a process controller for a nominal model with uncertainty so that a closed-loop control system remains stable and achieves a specified performance, regardless of the exact properties of an actual process.

Figure 2:
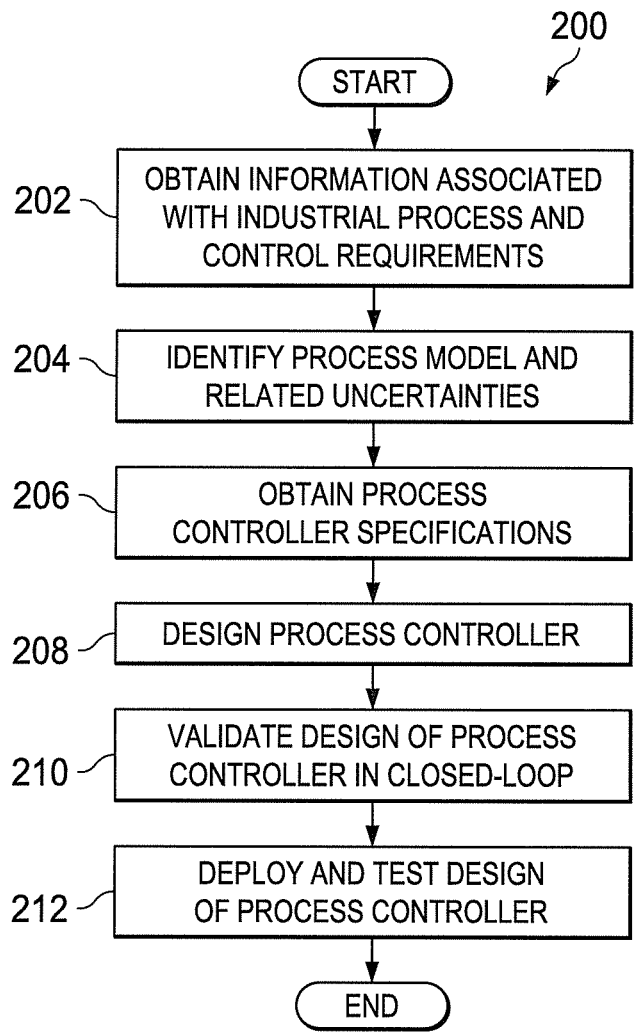
FIGS. 2 through 5 illustrate an example method for system analysis and robust controller design and related details according to this disclosure.

FIGS. 2 through 5 illustrate an example method 200 for system analysis and robust controller design and related details according to this disclosure. For ease of explanation, the method 200 is described as being performed using one or more of the operator stations 116, 124, 132, 140 in the system 100 of FIG. 1. However, the method 200 could be performed using any other suitable device and in any other suitable system. Note that FIG. 2 illustrates the method 200 generally, while in practice not all steps may need to be followed exactly in every case and the importance of each step can vary.

As shown in FIG. 2, information associated with an industrial process and any control requirements for the industrial process is obtained at step 202. One purpose of this step is to understand the dynamic behavior of the industrial process. This is typically done by performing step tests near process operating points, such as by looking at the speed and directionality of a step response of an actual process or a simulation of its approximate model. Some aspects of an industrial process that could be identified in this step include process variables that need to be controlled, acceptable variations from setpoints for these variables, and the magnitude and frequency of disturbances entering the process. Other aspects could include limitations imposed on the industrial process by its sensors and actuators. Examples of actuator limitations include dynamics, maximum and minimum limits, hysteresis, and other nonlinearities. Typical sensor limitations often arise from sampling-time constraints, accuracy, and precision or noise characteristics. Note that this step could involve an operator console executing various tools to support functions such as step testing, data analysis, key process variable identification, and information acquisition regarding sensor or actuator limitations. However, a user could obtain this information in other ways and may or may not rely on an operator console to obtain this information.

A process model and associated uncertainties are identified for the industrial process at step 204. This could include, for example, the operator console analyzing information about the industrial process to identify an estimated process model, which mathematically represents the process. A number of model identification approaches are known in the art. For example, in some embodiments, an industrial process can be modeled with first-principles equations (such as mass, charge, and energy balances) or by performing identification experiments to fit a model to collected data. Models based on first principles can provide a deeper understanding of a process both at a nominal operating point and away from it. However, this approach can be complex and time-consuming, and it is not always clear what level of model detail is needed for controller design purposes (such as lumped or distributed models, quasi steady-state or transient with many time scales, etc.).

A straightforward approach is to carry out identification experiments to obtain a process model (such as a Laplace transfer function). This can involve perturbing an industrial process during step testing and fitting a model to recorded input-output time-series data. Many software packages and other tools are available for fitting a model to process data. Example system identification procedures for robust control are described in the following documents (all of which are hereby incorporated by reference in their entirety):

Lennart Ljung, "System Identification—Theory for the User," 2nd edition, PTR Prentice Hall, Upper Saddle River, N. J., 1999;

Zhan et al., "System Identification for Robust Control," American Control Conference, 2007, ACC '07, pp. 846-851, 9-13 Jul. 2007;

Alvarez et al., "pH Neutralization Process as a Benchmark for Testing Nonlinear Controllers," Industrial & Engineering Chemistry Research 2001 40 (11), pp. 2467-2473; and Åström et al., "PID controllers: theory, design, and tuning," Research Triangle Park, N.C.: Instrument Society of America, 1995.

With recent advances in both theory and computational tools, there is a growing interest towards data-driven empirical models that by design emphasize only the more important components of the system response, actuator and sensor dynamics, nonlinearities, and accuracy characteristics. The availability of actual data also allows for the computation of realistic estimates of dynamic uncertainty, which is often important in controller design. This estimate can take many forms (such as multiplicative uncertainty) and describes the range of operating conditions over which the model is valid. On the other hand, empirical models are not easy to generalize or use for extrapolation purposes away from the modeled operating conditions. Thus, a combination of first-principles modeling (to determine a suitable model structure and design the identification experiments) and data-driven modeling (for fine tuning and uncertainty characterization) may offer a good approach to developing a control-relevant model. The data-driven (empirical) modeling can be based on identification experiments designed using the first-principles modeling, and the empirical model can have the model structure identified using the first-principles modeling. The exact characteristics of each model may not be easy to determine a priori, but existing empirical models of a process (incorporating past knowledge and conventional wisdom) can be used as well, as long as the uncertainty characterization step is performed.

Understanding dynamic uncertainty of a process model (how a process behavior differs from that of the process model) is often an important aspect of robust controller design. Uncertainty can be characterized in several different ways, and they are not always equivalent. Uncertainty is typically expressed in the frequency domain because this form can handle general perturbations. In addition, powerful computational techniques are available to design optimal controllers in the frequency domain. In contrast, parametric uncertainty, while fairly intuitive, is often only capable of describing a few types of perturbations, and the associated design tools are not as well developed.

Figure 3:
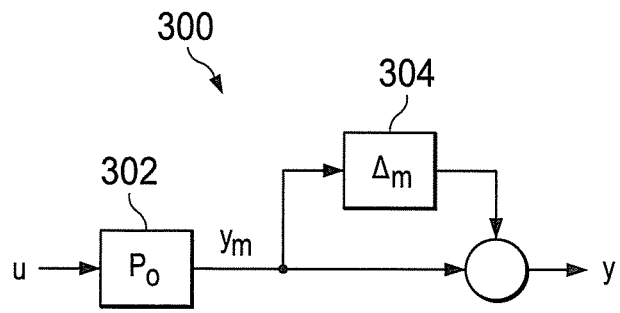

A conceptually simple and fairly general characterization of uncertainty can be expressed in terms of multiplicative uncertainty ($\Delta_m$), which refers to the error as a percentage of output. Multiplicative error is not necessarily random and may instead be described by an unknown transfer function. FIG. 3 provides a representation 300 of how a controller can be modeled as a nominal system model with multiplicative uncertainty. Here, a nominal process model $P_0$ 302 receives inputs u and generates process outputs $y_m$ estimated with the model. A multiplicative uncertainty $\Delta_m$ 304 affects the system, which modifies the estimated process outputs $y_m$ to produce actual outputs y of the process (which could be recorded during identification experiments). The multiplicative uncertainty $\Delta_m$ describes the difference between the actual process and the nominal model as a normalized error, which could be expressed as:

$$\Delta_m = \frac{P - P_0}{P_0} \quad (1)$$

where P denotes the transfer function describing the relationship between the input u and the output y of the actual process, and $P_0$ denotes the transfer function describing the relationship between the input u and the output $y_m$ of the nominal model.

For nonlinear systems, the multiplicative uncertainty $\Delta_m$ of a process model at a nominal operating point can be estimated by plugging values for a process parameter at different operating points into the transfer function P. Upper and lower bounds of the multiplicative uncertainty can be calculated in this way. This provides an estimate of the error, which is only accurate under the assumption of quasi steady-state conditions, but it is useful to establish the minimum degree of robustness that a controller should possess. Given a set of possible process models at different operating points, one can obtain an estimate of the uncertainty for a given nominal model $P_0$ by computing an envelope that bounds the maximum frequency response magnitude of all multiplicative error.

At a given frequency ω, the magnitude of the multiplicative uncertainty (expressed as $|\Delta_m(j\omega)|$) can be calculated using a fast Fourier transform (FFT) or other algorithm that converts time-based data into frequency-based data, such as by using the data obtained from identification experiments. A simple formula for calculating the frequency-domain estimate of multiplicative uncertainty can be defined as:

$$|\Delta_m(j\omega)| = \frac{|FFT(y - y_m)|}{|FFT(y_m)|} \quad (2)$$

where j denotes an imaginary number (the square root of −1), FFT denotes a fast Fourier transform, y denotes the output of the industrial process (such as is recorded during identification experiments), and $y_m$ denotes the process output estimated with the model.

Figure 4:
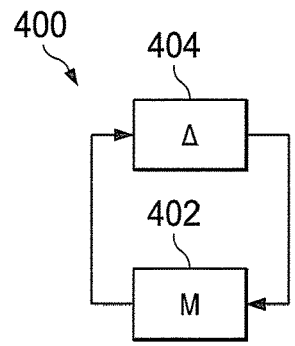

The small-gain theorem is a powerful rule to assess the stability of a multiple-input, multiple-output (MIMO) feedback system in the presence of perturbations. FIG. 4 illustrates an example feedback system 400 with a modeled segment M 402 and an uncertain segment Δ 404. Because the system may be changing depending on the operating conditions and time, only a limited amount of information, the peak magnitude of the system's frequency response, is available. According to the small-gain theorem, this closed-loop system is stable for all stable uncertainties that satisfy the condition:

$$|\Delta(j\omega)||M(j\omega)| < 1 \text{ for all } \omega \tag{3}$$

where $\Delta$ denotes the frequency response of the uncertainty (whose bounds are available), and M denotes the nominal closed-loop transfer function. This inequality is referred to as a robust stability condition for a feedback system. Referring to FIG. 4, the MIMO feedback system 400 will be stable as long as the modeled segment M 402 and the uncertainty $\Delta$ are stable and the product of their gains satisfies Equation (3) for all frequencies.

Figure 5:
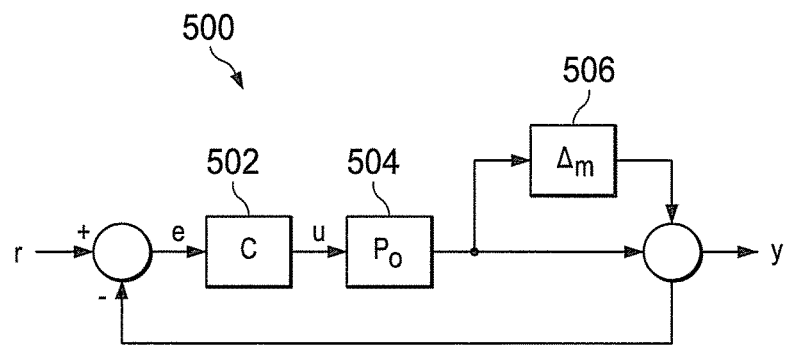

The application of the small-gain theorem to a feedback system 500 with multiplicative uncertainty is illustrated in FIG. 5. This feedback system 500 includes a controller C 502, a nominal process model $P_0$ 504, and a multiplicative uncertainty $\Delta_m$ 506. The system 500 receives a setpoint r, which is combined with feedback to generate a tracking error e. The controller 502 uses the tracking error e to generate a control input u provided to the model 504, and the process itself generates the process output y. The system connected to the uncertainty has a transfer function equal to the complementary sensitivity. The feedback system 500 can be described by the following robust stability condition:

$$|\Delta_m(j\omega)||T(j\omega)| < 1 \text{ for all } \omega \tag{4}$$

where $|\Delta_m(j\omega)|$ denotes the magnitude of the frequency response of the uncertainty, and $|T(j\omega)|$ denotes the magnitude of the complementary sensitivity (T). The complementary sensitivity (T) could be expressed as:

$$T = \frac{P_0 C}{1 + P_0 C} \tag{5}$$

The complementary sensitivity is the closed-loop transfer function for unity feedback. In general, the multiplicative uncertainty $\Delta_m(j\omega)$ increases with frequency $\omega$, so Equation (4) implies that the complementary sensitivity should decrease as the frequency increases (meaning the complementary sensitivity should roll off as the frequency increases). An elementary approximation of such a constraint is a limitation on the closed-loop bandwidth and hence the speed of the response. Alternatively, this can be viewed as a signal-to-noise ratio (SNR) condition, namely that effective control can occur as long as the SNR (modeled output-to-output error) is greater than unity.

Thus, to help guarantee robust stability, a controller C for a nominal process model $P_0$ with a multiplicative uncertainty $\Delta_m$ could be designed such that the robust stability condition in Equation (4) is satisfied. This condition implies that the closed-loop bandwidth cannot be higher than that of the inverse multiplicative uncertainty and that excessive peaks (resonances) should be avoided. While exact specifications do depend on the detailed estimates of the uncertainty, traditional feedback design simplifies the problem by assuming smooth and well-behaved frequency responses, effectively converting the bandwidth constraint into a crossover frequency and the peaking constraint into a phase-margin specification.

Returning to FIG. 2, the overall outcome or result from steps 202-204 includes a process model and uncertainty bounds. The process model could be expressed in any suitable manner, such as a transfer function or a frequency response. Also, the uncertainty bounds could be expressed in any suitable manner, such as in the frequency domain in a manner compatible with controller design computations.

Process controller specifications are obtained at step 206. This could include, for example, the operator console obtaining information from a user specifying the control objectives for a process controller being designed. In some embodiments, the control objectives (i) quantify the desired performance characteristics of the controller being designed and its robustness constraints due to uncertainty and (ii) express them as an optimization problem. The selection of reasonable and achievable objectives can be done in order to ensure that the solution of the optimization problem also results in an acceptable controller. At the same time, it may be convenient to express control objectives in a form that can be easily understood by a user and for which physical insight is available.

In CPI applications, time-domain specifications for a closed-loop system may be preferred, such as the closed-loop time constant and the percent overshoot in a step setpoint change. It is typically necessary or desirable to design a closed-loop control system that responds quickly to setpoint changes with minimal overshoot. On the other hand, this may not be achievable due to process delays, inverse responses, or process uncertainties. The time-constant specification of a closed-loop system can be related to its closed-loop bandwidth in the frequency domain (approximately the inverse of the closed-loop time constant). The choice of closed-loop bandwidth (or indirectly the gain crossover frequency) for a controller design can be an important specification for the controller design as it directly corresponds to the speed of the closed-loop response. It is also a convenient design parameter since it can be easily manipulated to compute the controller parameters.

The achievable closed-loop bandwidth (theoretical limit) and the percent overshoot are affected by model uncertainty, sampling time of the sensors, and other delays in general, as well as by sensor noise and model characteristics (such as instability of the process model). Overall, the closed-loop specifications can be defined in terms of a "target loop," which could then be approximated by a closed-loop with the designed controller. This approximation problem is typically easier to solve computationally than a generic bandwidth or overshoot specification. The relationship between process model characteristics (such as signal-transit delays, inverse responses, and instability) and the choice of a target loop in controller design has been the subject of considerable analysis, such as in Doyle et al., "Feedback Control Theory," MacMillan, 1992 (which is hereby incorporated by reference in its entirety). Some example guidelines for target loop selection can be found in Grassi et al., "Integrated system identification and PID controller tuning by frequency loop-shaping," IEEE Transactions on Control Systems Technology, vol. 9, no. 2, pp. 285-294, March 2001 (which is hereby incorporated by reference in its entirety).

A process controller is designed at step 208. This could include, for example, the operator console generating one or more control parameters for a linear or nonlinear controller to be used to control the industrial process. Various types of sophisticated linear and nonlinear controllers are available, both in theory and in industrial applications. PID controllers are the most common type and are used in up to 95% of all CPI applications. Many procedures are available for tuning PID gains, including the Ziegler-Nichols, internal model control (IMC), and optimization-based techniques. When used appropriately, each of these techniques may generally work as well as the other. More substantial advantages of one technique over the others are typically in minimizing design iterations, providing clear results from the modeling and data collection steps, and ease of use and training. The choice of design procedure is not important as long as the designed controller satisfies a robust stability condition imposed to by uncertainty. In some embodiments, the design of a PID controller can be performed using frequency loop-shaping. In this method, PID parameters are tuned to achieve a loop transfer function close to a chosen target loop. The choice of a target loop, the procedure for tuning a PID controller, and the limitations of frequency loop-shaping are described in more detail in the Grassi et al. reference identified above.

The design of the controller is validated for use in a closed-loop system at step 210. This could include, for example, the operator console performing simulations to validate the designed controller in the frequency domain and in the time domain. Frequency-domain validation can include verification of the small-gain robust stability condition for the model uncertainty. Time-domain validation can involve analyzing the step responses of the closed-loop system to setpoint changes and disturbances. Depending on the severity of nonlinearities in actuators and sensors, a user could also evaluate the effect of saturated actuators, sensor sampling delays, noise, and quantization. For example, several iterations of steps 208-212 could be performed if the observed noise is too large and causes excessive movement in the actuators. As a more specific example, a loop bandwidth iteration may be used if the observed noise is large relative to the saturation level, in which case a high-bandwidth controller may not operate in its linear region.

The design of the controller is deployed and tested at step 212. This could include, for example, the operator station providing the controller parameters to an actual process controller in the system 100 or other system. This could also include the operator station or a user viewing operational data about the process controller and verifying whether the process controller is adequately controlling an industrial process. As a particular example, the operation of the process controller can be verified in terms of setpoint tracking and disturbance rejection. This can reveal inconsistencies (if any) between the testing conditions and the actual system operation, in which case a controller redesign or even a redesign of the excitation conditions for system identification may be performed.

Although FIGS. 2 through 5 illustrate one example of a method 200 for system analysis and robust controller design and related details, various changes may be made to FIGS. 2 through 5. For example, while shown as a series of steps, various steps in FIG. 2 could overlap, occur in parallel, or occur any number of times. Also, as noted above, not all steps of the method 200 may need to be followed exactly in every case, and the importance of each step can vary.

The following provides two examples of the application of the method 200 to different situations. In both cases, the method 200 is described as being used for pH control of a wastewater treatment process. This is for illustration only and does not limit the method 200 to any particular type of control or to any particular type of industrial process.

EXAMPLE #1

FIGS. 6 through 10 illustrate a first example application of the robust controller design technique to a pH control problem according to this disclosure. Here, the pH control problem involves maintaining the pH of material at a desired level, which is often needed in wastewater treatment for process optimization.

Figure 6:
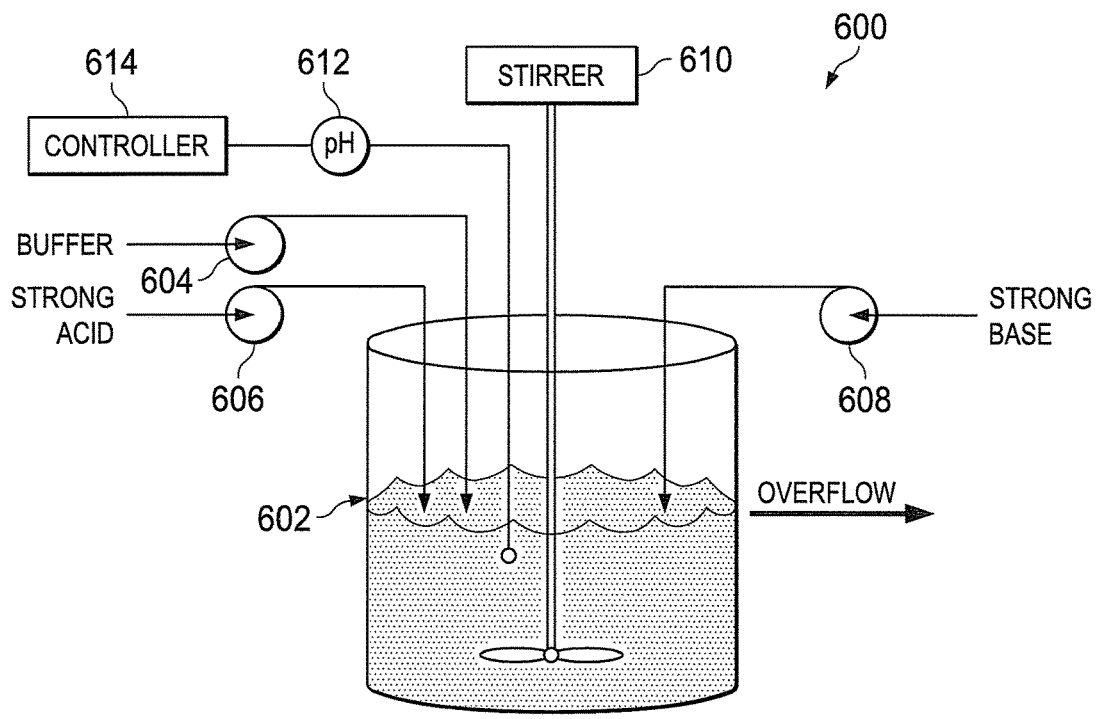
FIGS. 6 through 10 illustrate a first example application of the robust controller design technique to a pH control problem according to this disclosure.

FIG. 6 illustrates an example wastewater system 600, which generally operates to process wastewater so that the wastewater has a desired pH level. In this example, wastewater is mixed with other materials in a reactor 602, such as a continuous stirred-tank reactor (CSTR) at a treatment facility. Inlet streams to the reactor 602 are provided by pumps 604-608, which respectively provide a buffer material, a strong acid material, and a strong base material at respective flow rates of $q_1$, $q_2$, and $q_3$. An overflow outlet denotes an outlet stream. A stirrer 610 helps to ensure that the materials are adequately mixed in the reactor 602. A pH probe 612 can be inserted into the reactor 602 and used to measure the pH of the materials in the reactor 602. Measurements of pH are provided to a process controller 614, which can use one or more models associating pH level with one or more inputs into the reactor 602. In some embodiments, the process controller 614 uses one or more models to control the operation of the pumps 604-608 so that processed material output from the reactor 602 has a pH at a desired level or within a desired range (such as a pH of between 6 and 8).

In some embodiments, the process performed in the reactor 602 can occur as follows. The volume of water in the reactor 602 and its temperature are kept substantially constant. It may be assumed that perfect mixing occurs in the reactor 602 and that ions are completely soluble. The following chemical reactions can take place in the reactor 602: $H_2CO_2 \leftrightarrow HCO_2^- + H^+$, $HCO_2^- \leftrightarrow CO_2^{2-} + H^+$, and $H_2O \leftrightarrow OH^- + H^+$. The reactions are assumed to be at equilibrium, with equilibrium constants defined as follows:

$$K_{a1} = \frac{[HCO_2^-][H^+]}{[H_2CO_2]} \tag{6}$$

$$K_{a2} = \frac{[CO_2^{2-}][H^+]}{[HCO_2^-]} \tag{7}$$

$$K_w = [H^+][OH^-] \tag{8}$$

The pH of the solution is the negative logarithm of the hydrogen ion concentration, which is expressed as:

$$pH = -\log_{10}[H^+] \tag{9}$$

The chemical equilibria can be modeled based on the concept of reaction invariance. For this system, each input or output stream is associated with two reaction invariants: $W_a$ (a charge-related quantity) and $W_b$ (a concentration of carbonate ions). These can be expressed as:

$$W_{ai} = [H^+]_i - [OH^-]_i - [HCO_3^-]_i - 2[CO_3^{2-}]_i \tag{10}$$

$$W_{bi} = [H_2CO_3]_i + [HCO_3^-]_i + [CO_3^{2-}]_i \tag{11}$$

where i denotes the stream number (i=1 to 3 for the three inlet streams, and i=4 for the outlet stream). The relationship between hydrogen ion concentration and reaction invariants can be expressed as:

$$W_{bi} \frac{\frac{K_{a1}}{[H^+]} + \frac{2K_{a1}K_{a2}}{[H^+]^2}}{1 + \frac{K_{a1}}{[H^+]} + \frac{K_{a1}K_{a2}}{[H^+]^2}} + W_{ai} + \frac{K_w}{[H^+]} - [H^+] = 0 \tag{12}$$

A dynamic model for the pH neutralization process can be derived from component material balances for the reaction invariants $W_a$ and $W_b$ and the algebraic equation relating the pH and the reaction invariants. Nominal operating conditions of an example implementation of the system 600 are provided in Table 1.

TABLE 1

Nominal Operating Properties of pH Neutralization Process

| Variable | Value | Variable | Value |
|---|---|---|---|
| $K_{a1}$ | $4.47 \times 10^{-7}$ | V | 2,500 mL |
| $K_{a2}$ | $5.62 \times 10^{-11}$ | $q_1$ | 540 mL/min |
| $pK_1$ | 6.349692 | $q_2$ | 36 mL/min |
| $pK_2$ | 10.25026 | $q_3$ | 510 mL/min |
| $W_{a1}$ | $3 \times 10^{-3}$ M | $W_{b1}$ | 0M |
| $W_{a2}$ | $-0.03$M | $W_{b2}$ | 0.03M |
| $W_{a3}$ | $-3.05 \times 10^{-3}$ M | $W_{b3}$ | $5.0 \times 10^{-5}$ M |
| $W_{a4}$ | $-4.32 \times 10^{-4}$ M | $W_{b4}$ | $5.38 \times 10^{-4}$ M |

A nonlinear model for this process can be described by mass- and charge-balance equations (Equations (13) and (14)) and the relationship between reaction invariants and pH (Equation (15)) as follows:

$$\frac{d(W_{a4})}{dt} = \frac{1}{V}[q_1(W_{a1} - W_{a4}) + q_2(W_{a2} - W_{a4}) + q_3(W_{a3} - W_{a4})] \quad (13)$$

$$\frac{d(W_{b4})}{dt} = \frac{1}{V}[q_1(W_{b1} - W_{b4}) + q_2(W_{b2} - W_{b4}) + q_3(W_{b3} - W_{b4})] \quad (14)$$

$$0 = W_{a4} + 10^{(pH-14)} - 10^{(-pH)} + W_{b4}\frac{1 + 2 \times 10^{(pH-pK_2)}}{1 + 10^{(pK_1-pH)} + 10^{(pH-pK_2)}} \quad (15)$$

where V is the volume of the reactor (mL), and $pK_1$ and $pK_2$ are the $pK_a$ values of streams 1 and 2, respectively.

The process model can be linearized around pH=6 and pH=8, and the transfer functions of these models in minutes can be represented by:

$$P_m(s) = \frac{K}{\tau s + 1} \quad (16)$$

Here, $P_{m6}(s)$ and $P_{m8}(s)$ are the transfer functions of linear models at pH=6 and pH=8, respectively. Also, K denotes the process gain, $\tau$ denotes the process time constant, and s denotes time in minutes. The values of K and $\tau$ for both models are provided in Table 2.

TABLE 2

Transfer Functions of Linearized Process Models

|  | K | $\tau$ |
|---|---|---|
| $P_{m6}$ | $1.5042 \times 10^{-2}$ | 2.6 |
| $P_{m8}$ | $1.014 \times 10^{-1}$ | 2.372 |

Figure 7:
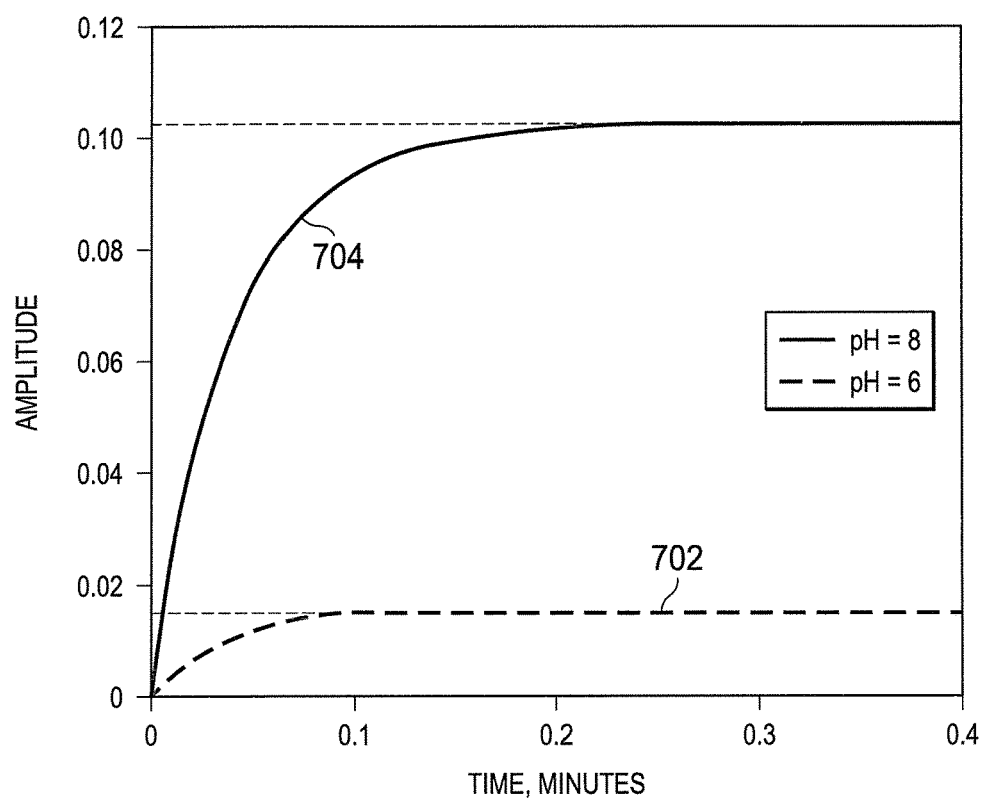

The unit step responses of these process models $P_{m6}(s)$ and $P_{m8}(s)$ are shown in FIG. 7, where line 702 identifies the unit step response of $P_{m6}(s)$ and line 704 identifies the unit step response of $P_{m8}(s)$. The models have similar time constants but very different steady-state gains, which is a characteristic of first-principles models.

Figure 8:
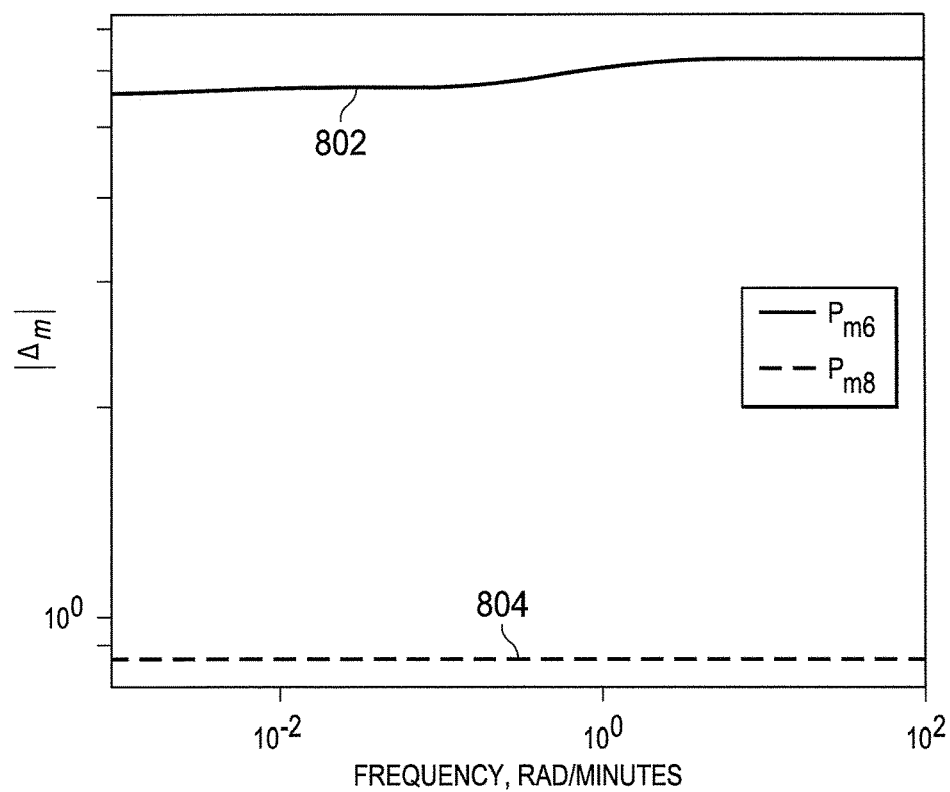

To determine the suitability of a single controller to control this process, one can consider the performance of a controller designed for one pH value and evaluate the controller at all other pH operating points. For example, one could choose pH=6 as the nominal operating point for the controller design and calculate the multiplicative uncertainty for the model at pH=8. The plots of multiplicative error provide an estimate of multiplicative uncertainty arising due to changes in the operating conditions. FIG. 8 shows the multiplicative uncertainty for both nominal models, where line 802 identifies the multiplicative uncertainty for $P_{m6}(s)$ when pH=8 and line 804 identifies the multiplicative uncertainty for $P_{m8}(s)$ when pH=6. In both cases, the multiplicative uncertainty is near or greater than one. Thus, the stability condition stated in Equation (4) is either violated or satisfied by a very small margin, implying that a single linear controller is not sufficient and cannot guarantee good control performance in the sense of approximating a particular closed-loop target response. The uncertainty in more detailed models may also be affected by the inclusion of actuator and sensor dynamics (which themselves can be uncertain), but this is not considered here.

To complete the controller design step, a target bandwidth of 0.6 rad/min (time constant of 1.67 minutes) can be chosen based on sensor sampling constraints (>1 second), actuator capabilities, and some trial-and-error. The transfer functions of PI controllers (a derivative action is not needed for this process model) are denoted as $C_{m6}(s)$ and $C_{m8}(s)$, corresponding to the linearized process models at pH=6 and pH=8, respectively. As a particular example, the transfer functions can be expressed as:

$$C_{m6}(s) = 106.53\left(1 + \frac{1}{1.44s}\right) \quad (17)$$

$$C_{m8}(s) = 14.20\left(1 + \frac{1}{1.38s}\right) \quad (18)$$

The $C_{m6}$ controller fails frequency-domain validation since the value of the multiplicative uncertainty is greater than one for all frequencies and, even though there is no closed-loop instability, this is manifested as a large variability in the closed-loop responses.

Figure 9:
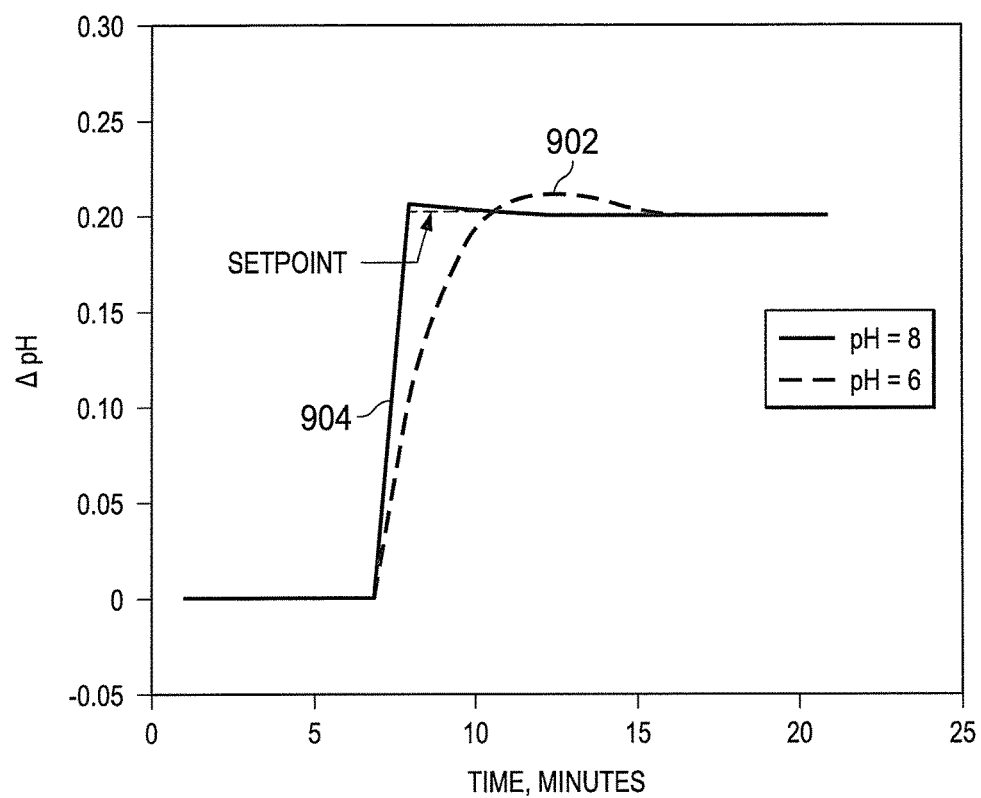
Figure 10:
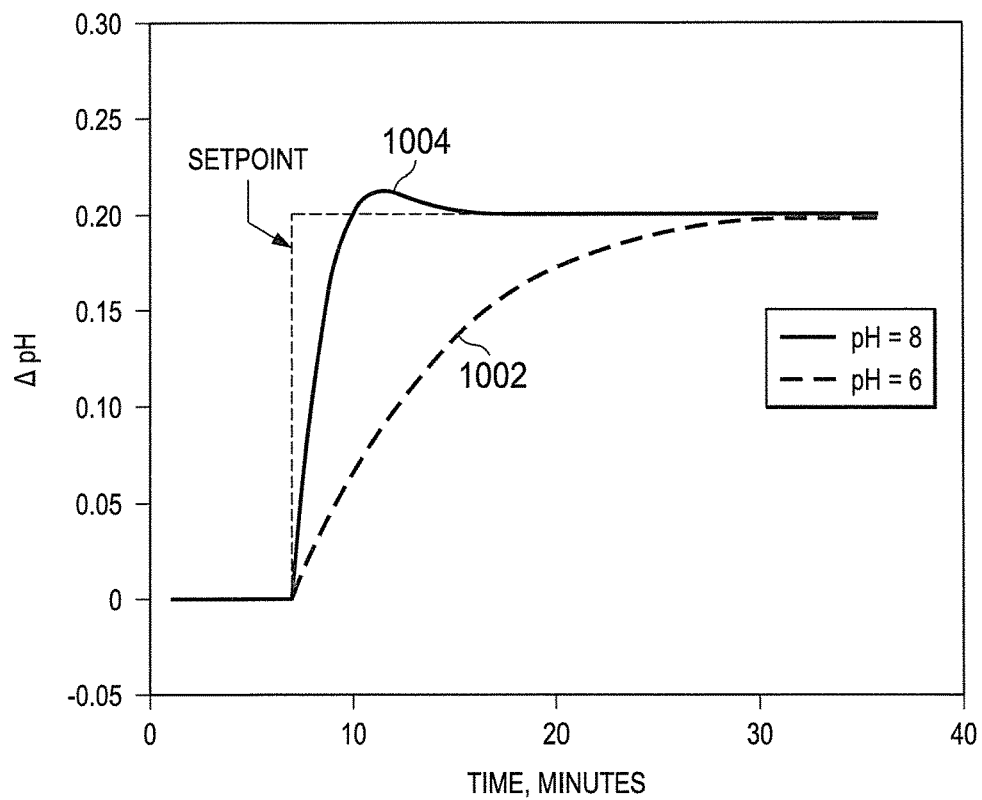

FIGS. 9 and 10 show the step responses of the closed-loop system with controllers $C_{m6}$ and $C_{m8}$, respectively. Lines 902-904 in FIG. 9 are associated with the $C_{m6}$ controller, and lines 1002-1004 in FIG. 10 are associated with the $C_{m8}$ controller. At pH=6, $C_{m6}$ performs as expected with a settling time of about eight minutes (line 902). Similarly, at pH=8, $C_{m8}$ performs as expected with a settling time of about one minute (line 1002). However, the response of the closed-loop system at pH=6 with $C_{m8}$ is very slow with a settling time of about 25 minutes (line 1004). The response of the closed-loop system at pH=8 with $C_{m6}$ is very fast with a settling time of about one minute (line 904), but the fast response can be undesirable since the choice of bandwidth may ultimately depend on uncertainty and robustness considerations (and a faster loop may exhibit instability). On the other hand, the integral time constants for both models are very similar, 1.44 for $C_{m6}$ and 1.38 for $C_{m8}$. The difference between the controllers is essentially limited to gain variations, 106.53 for $C_{m6}$ and 14.20 for $C_{m8}$. These characteristics indicate that a nonlinear (gain-scheduled or adaptive) controller can work well for this process.

This first example illustrates the use of the method 200 with a classical pH control problem involving a first-principles model. The step responses of the model used in this example produce severe nonlinear behavior at two operating points of interest. This nonlinearity is also reflected in the computation of the differences between the linearized models at these two operating points. Treating these differences as uncertainty and applying robust control design tools reveals that no single controller designed at a specific operating point (such as pH=6 or pH=8) would be able to perform satisfactorily in terms of the intended design specifications. Robust control tolerates the general process uncertainty and the nonlinearity in the process. However, it does so with a loss in performance. An adaptive controller, on the other hand, may be able to handle the large perturbations due to gain changes without deterioration in performance. Such a design would be significantly more complicated since an adaptive controller is nonlinear and its sensitivity to noise and unmodeled dynamics is not as straightforward as for linear models.

EXAMPLE #2

This example shifts to the problem of computing realistic estimates of model uncertainty from data obtained via identification experiments. The data is used to determine feasible performance objectives (such as bandwidth) so that a corresponding controller produces a desired response with a high degree of confidence.

FIGS. 11 through 15B illustrate a second example application of the robust controller design technique to a pH control problem according to this disclosure. For this example, the wastewater system 600 of FIG. 6 is simulated in a laboratory environment using a 500 mL magnetically-stirred beaker as the reactor 602 and using additional beakers to store the buffer, acid, and base materials and to store overflow from the reactor 602. The controller 614 can be implemented using a microcontroller, such as an Arduino MEGA microcontroller, and data acquisition and pH sensor interfaces can be made using I²C and serial communications, respectively. The controller 614 operates to control the amount of base material provided to the reactor 602 by the pump 608, while flow rates of buffer and acid material could be fixed, such as at about 2.45 mL/minute.

Example #1 above designed and evaluated pH controllers based on modeling at two specific pH levels, namely pH=6 and pH=8. For Example #2, laboratory experiments can be performed over a wider pH range, such as from pH values of 5 to 9. Nominal models can be designed at pH values of 6 and 8, but they can be evaluated over a wider range of pH. This wider set of conditions can be used to illustrate the highly nonlinear characteristics of the pH response and the restrictions this nonlinearity can impose on the selection of a single controller to operate at various operating conditions.

To identify a system model, a pseudo-random binary sequence (PRBS) can be used for step testing, with the flowrate of the base material as the input variable, a switching time of 100 seconds, and a magnitude of input variation chosen to perturb the system around pH values of 5-9. The interest in the two extreme values (pH=5 and pH=9), which are outside the operating range of the application, is to enable the assessment of the model beyond the nominal operating range. The output (pH) sequences can be measured and fitted to linear dynamic models.

The reactor size is 500 mL and the total flowrate into the reactor is about 7.35 mL/minute, so the approximate settling time for a step change in flowrate is about 3.4 hours, which is three times the system's time constant of 1.13 hours. This response time is significantly slower than that of the simulation model discussed for Example #1. Based on equipment limitations and the desire to vary the pH from 5 through 9, an integrating model over a time scale of a few minutes can be selected to represent the data.

Figure 11:
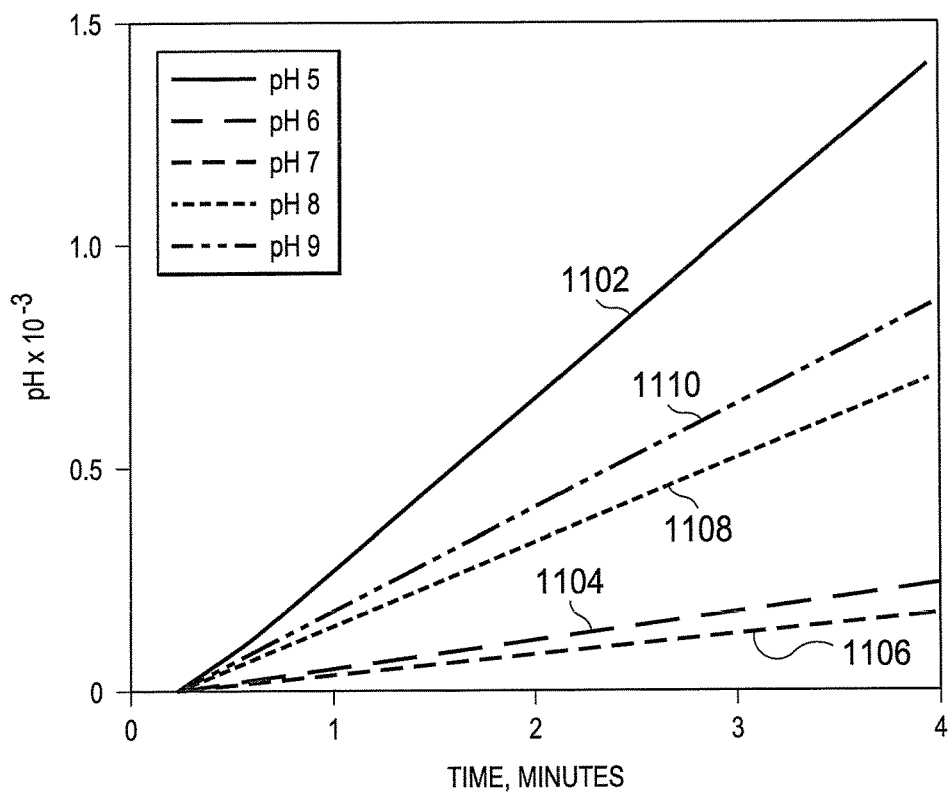
FIGS. 11 through 15B illustrate a second example application of the robust controller design technique to a pH control problem according to this disclosure.
Figure 12:
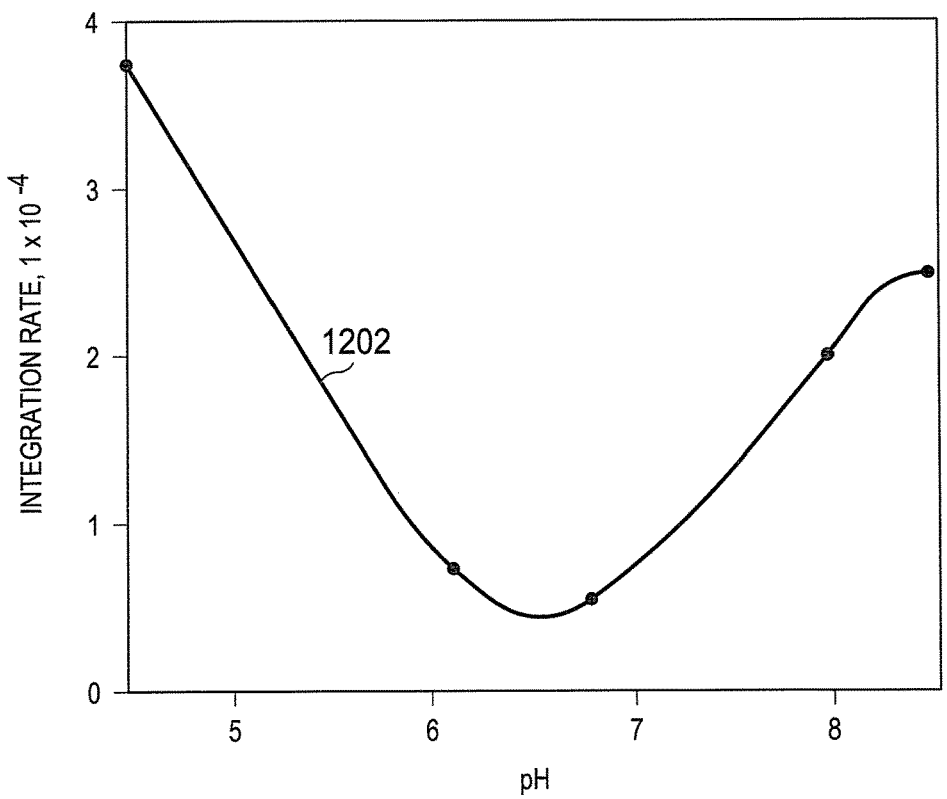
Figure 13A:
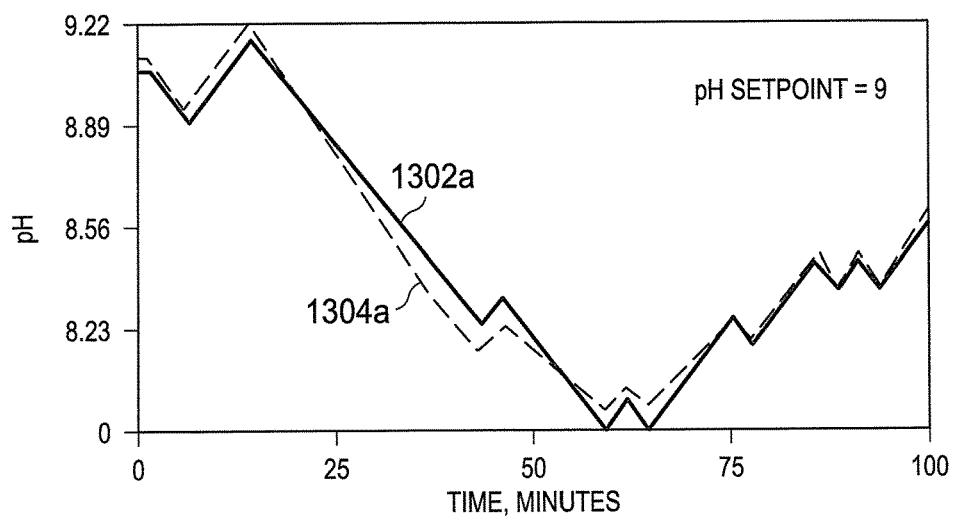
Figure 13B:
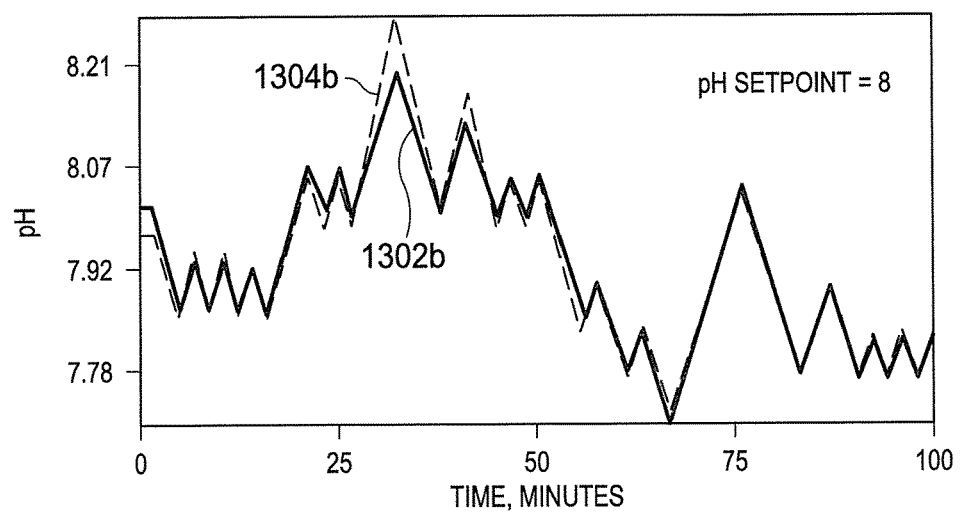
Figure 13C:
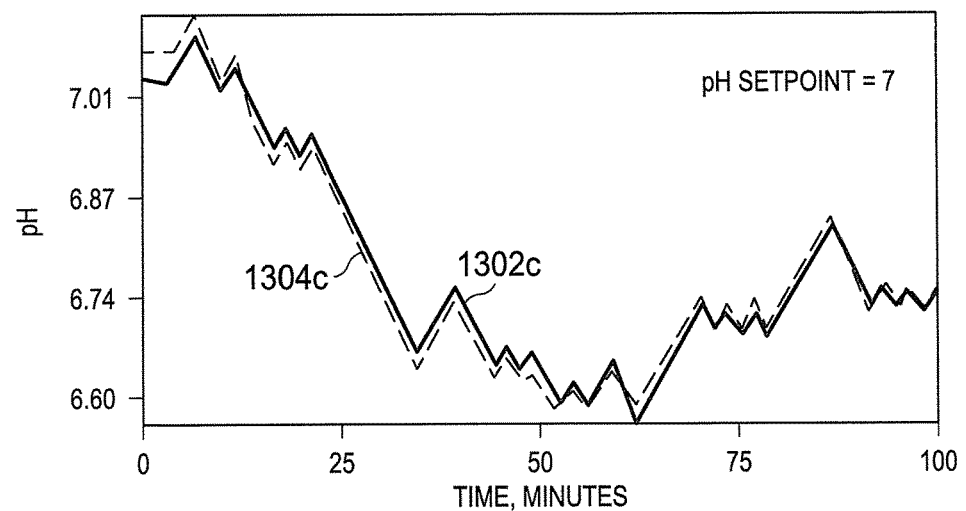
Figure 13D:
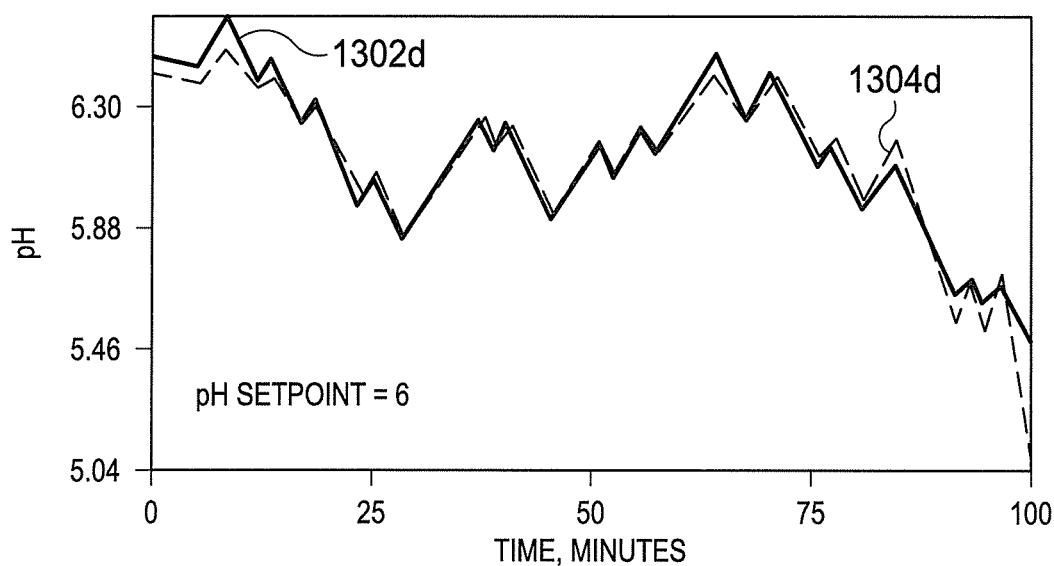
Figure 13E:
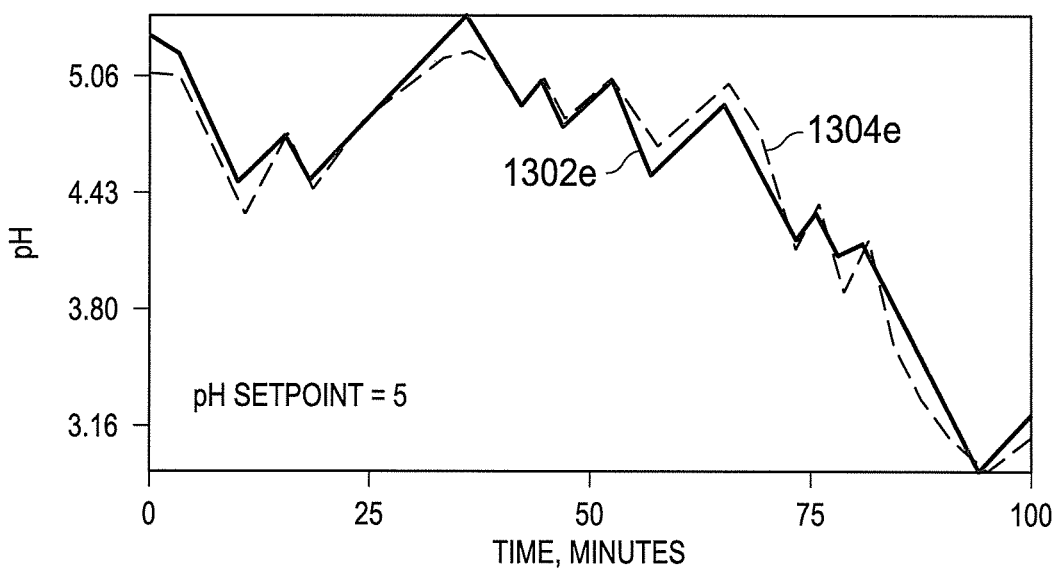

FIG. 11 shows the step responses of the models at each operating point over four minutes, where lines 1102-1110 are associated with pH levels of 5, 6, 7, 8, and 9, respectively. FIG. 12 shows a curve 1202 fit to the integration rate as a function of pH, where the integration rate represents the slopes of the lines 1102-1110 in FIG. 11. The integration rate represents the steady-state rate of change of the pH with respect to time. The lowest integration rate is at pH=7, while the highest integration rate is at pH=5.

The quality of the models can be determined by plotting the predicted pH against the actual pH at the various pH levels. This is done in FIGS. 13A through 13E, where lines 1302a-1302e represent pH values predicted by an open-loop model and lines 1304a-1304e represent actual pH measurements. As can be seen here, the predictions are very close to the actual data, which illustrates the high quality of the models. The transfer functions of the models at pH values of 5-9 have the form of:

$$P(s) = \frac{K(\tau_1 s + 1)}{s(\tau_2 s + 1)} e^{-T_d s} \tag{19}$$

where K denotes the process gain, s denotes the Laplace variable, τ denotes the time constant, and $T_d$ denotes the transport delay. Table 3 lists the parameters for Equation (19), where the subscripts denote the pH.

TABLE 3

Parameters for Transfer Function of Models at pH Values of 5-9

| | K | $T_d$ | $\tau_1$ | $\tau_2$ |
|---|---|---|---|---|
| $P_5$ | $3.77 \times 10^{-4}$ | 0.267 | 0 | $1.6 \times 10^{-5}$ |
| $P_6$ | $6.69 \times 10^{-5}$ | 0.367 | 2.65 | 2.8 |
| $P_7$ | $4.96 \times 10^{-5}$ | 0.217 | 0 | 0.0625 |
| $P_8$ | $2.02 \times 10^{-4}$ | 0.183 | 0 | 0.124 |
| $P_9$ | $2.48 \times 10^{-4}$ | 0.367 | 0.125 | 0.0334 |

Figure 14:
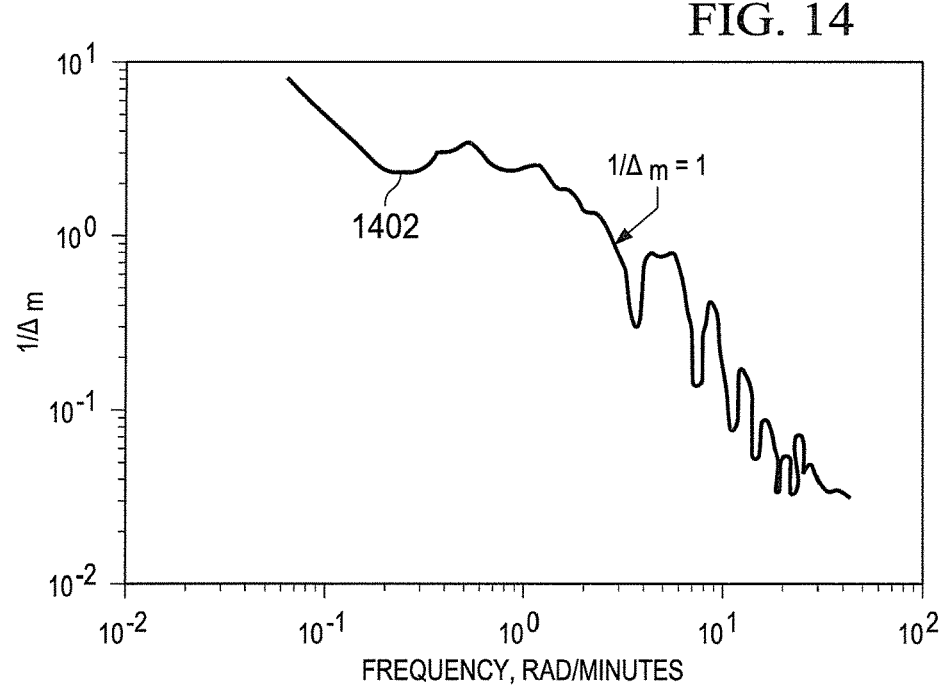

Next, the uncertainty analysis examines the ratio of the spectral power of the residuals ($|FFT(y-y_m)|$) to the model output ($|FFT(y_m)|$), which provides an estimate of SNR in the frequency domain. A variety of spectral methods can be used for this computation. FIG. 14 plots a line 1402 showing the inverse of the multiplicative uncertainty estimate, which serves as an upper bound on the loop complementary sensitivity, which in turn provides an upper bound on the controller gain. For the robust stability condition to be satisfied, the loop should have a bandwidth less than 1 rad/min, which is the point at which the inverse multiplicative uncertainty $1/\Delta_m$ equals one as shown in FIG. 14. At higher frequencies, the inverse multiplicative uncertainty becomes less than one, which indicates that the controller should be attenuating the loop signals.

Based on the uncertainty estimate, a loop bandwidth of 0.6 rad/min can be chosen for the controller design for both process models (pH=6 and pH=8), as it satisfies robustness with some margin and sampling time constraints and is consistent with actuator saturation limits and quantization noise levels (the last can be verified by a few loop simulations). Two controllers can be designed, one for pH=6 and the other for pH=8. The closed-loop systems can be tested at nominal (design) and off-nominal conditions. The transfer functions of the two PI controllers could be:

$$C_{m6}(s) = 12,450\left(1 + \frac{1}{2.94s}\right) \quad (20)$$

$$C_{m8}(s) = 3,596\left(1 + \frac{1}{2.36s}\right) \quad (21)$$

Figure 15A:
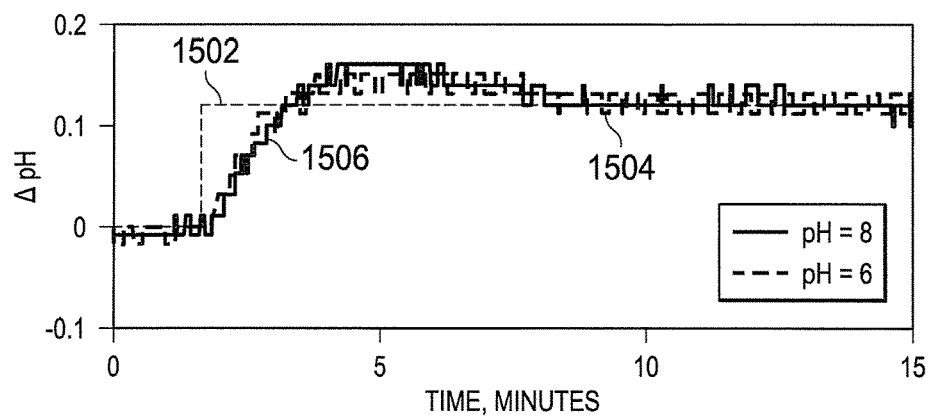
Figure 15B:
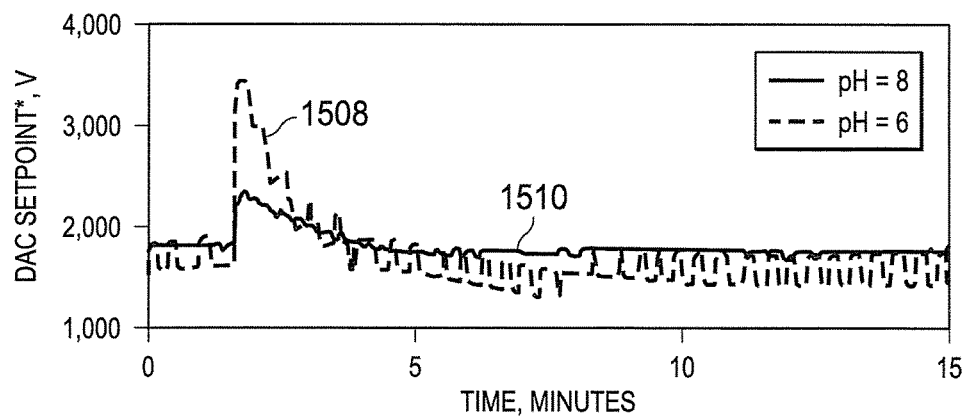

Both controllers satisfy the small-gain theorem (Equation (4)) for their respective model uncertainty and provide reasonable responses during a simulation-based validation. FIGS. 15A and 15B show experimentally-measured step responses of the closed-loop system with the controllers $C_{m6}$ and $C_{m8}$ at their respective nominal pH conditions. In FIG. 15A, line 1502 denotes a setpoint change, and lines 1504-1506 denote the changes to the pH level in response to the setpoint change at pH=6 and pH=8, respectively. In FIG. 15B, lines 1508-1510 denote the flowrate of base material in response to the setpoint change at pH=6 and pH=8, respectively. These agree well with the simulated closed-loop responses, implying the success of the identification process.

Although FIGS. 6 through 15B illustrate example applications of the robust controller design technique to a pH control problem, various changes may be made to FIGS. 6 through 15B. For instance, the method 200 could be used to help design controllers for use within any other suitable control problems, including other pH control problems.

Discussion and Conclusions

Experimental results show significant performance degradation in pH control away from nominal design conditions. This degradation is due to the nonlinear behavior of the process and becomes more severe as the process is moved (such as by disturbances) to operating points outside the nominal range.

Figure 16:
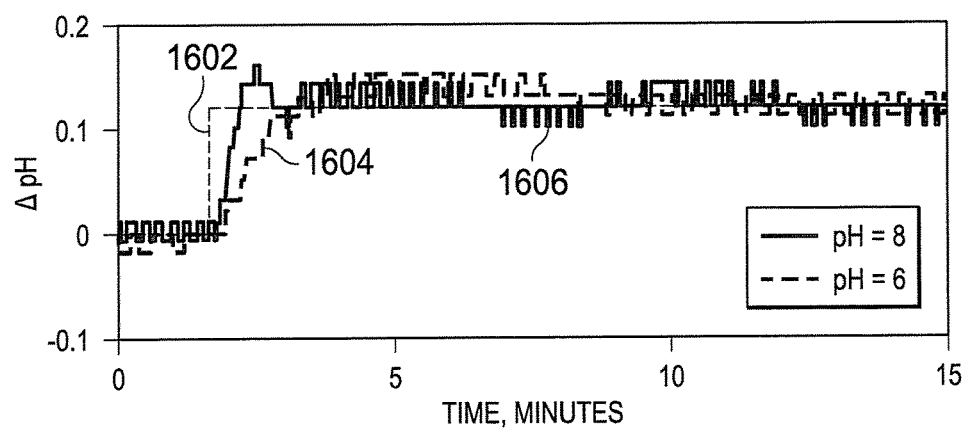
FIGS. 16 through 20 illustrate specific examples of experimental results involving a pH control problem according to this disclosure.
Figure 17:
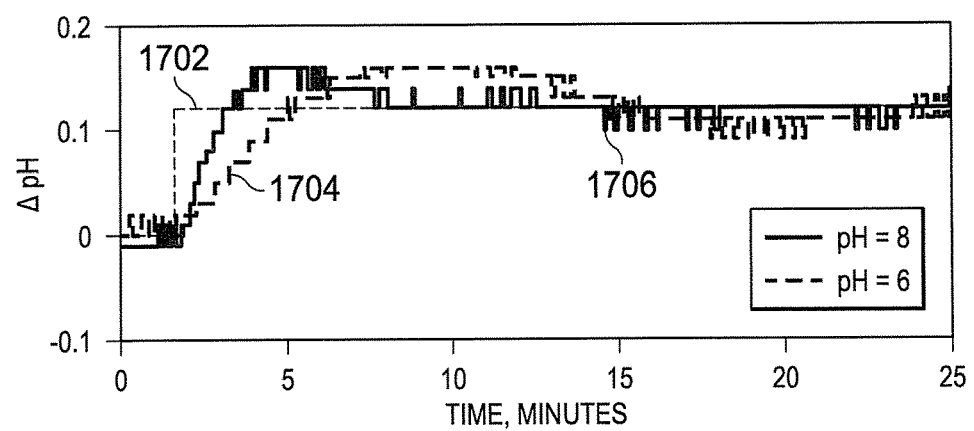
Figure 18:
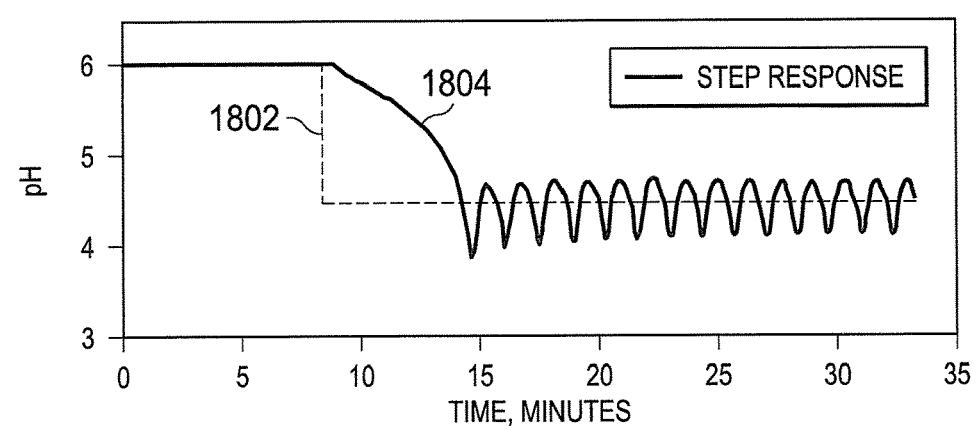

FIGS. 16 and 17 compare the closed-loop responses of the controllers at their alternative operating points (off-nominal conditions), meaning the $C_{m6}$ controller is at pH=8 and the $C_{m8}$ controller is at pH=6. Lines 1602 and 1702 denote a setpoint change, lines 1604 and 1704 denote the changes to the pH level caused by the $C_{m6}$ controller in response to the setpoint change, and lines 1606 and 1706 denote the changes to the pH level caused by the $C_{m8}$ controller in response to the setpoint change. The performance degrades and becomes either too slow or too fast, which in some cases can also result in oscillatory behavior or instability. FIG. 18 shows one such extreme case, where line 1802 denotes a setpoint change and line 1804 denotes the step response of the destabilized closed-loop system when the $C_{m6}$ controller operates near pH=4.5 and where the process gain is high.

Figure 19:
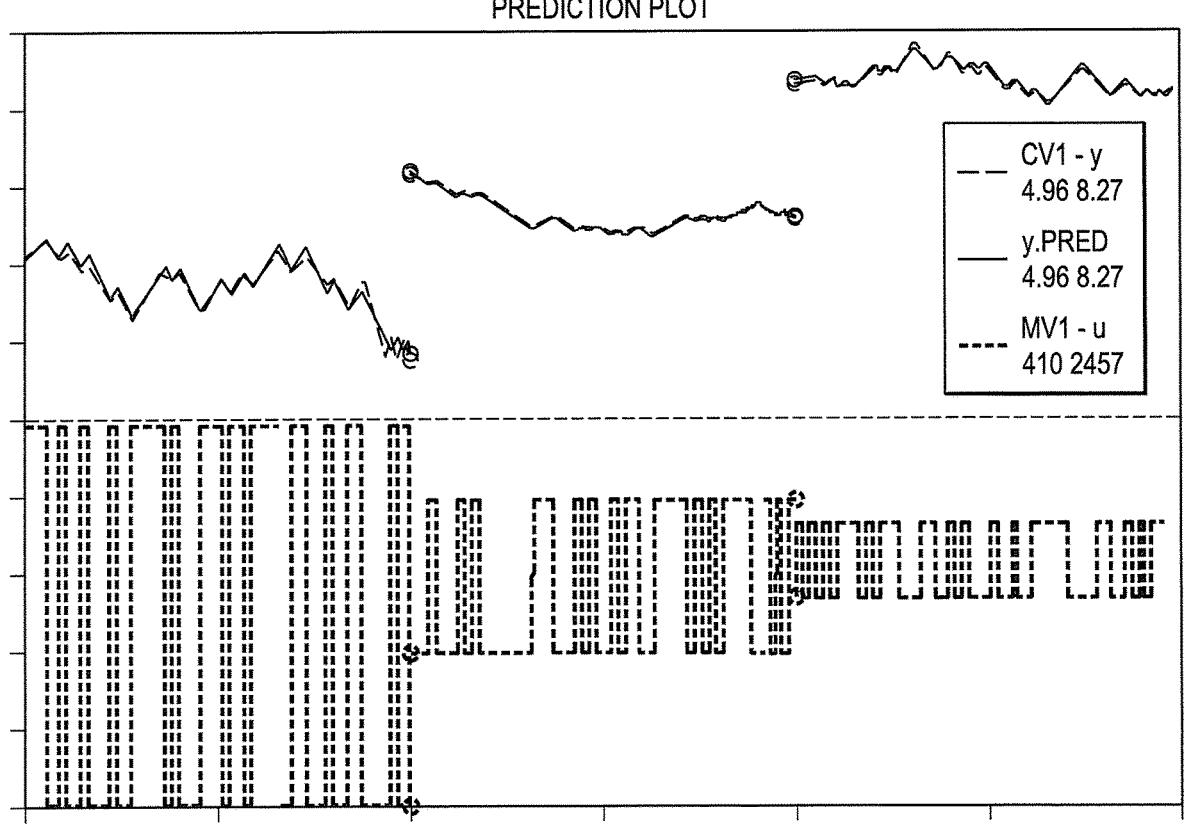
Figure 20:
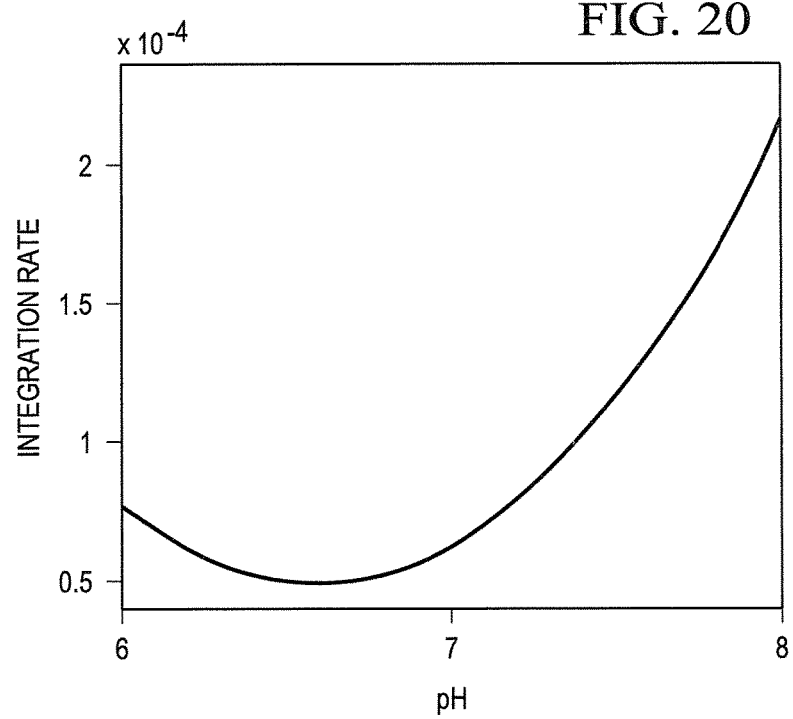

This raises the question if control performance can be improved by online controller scheduling or adaptation. As a first step to answer this question, a nonlinear identification can be performed on the ensemble of experimental data, such as by using the method described in MacArthur, "A new approach for nonlinear process identification using orthonormal bases and ordinal splines," Journal of Process Control, 22 (2012) 375-389 (which is hereby incorporated by reference in its entirety). As it turns out, this data can be well-represented by a Hammerstein model with fixed linear dynamics. Prediction results are given in FIGS. 19 and 20. FIG. 19 illustrates open-loop predictions using a nonlinear Hammerstein model, and FIG. 20 illustrates the integration rate as a function of pH.

Assume fixed linear dynamics are defined by the following transfer function:

$$P_6(s) = \frac{1.12 \times 10^{-4}(12.42s + 1)}{(0.335s^3 + 1.16s^2 + s)} \quad (22)$$

The integration rate characteristics can be defined in terms of a user-specified grid as described in MacArthur and can be displayed as a function of the inputs. If the rate is fit to the mean pH value of the data sets, the rate curve as a function of pH for this data could be as depicted in FIG. 20. The nonlinear model is close to the local linearized modes, and as such it has similar local uncertainty description. This implies that it can be used as the basis for a gain scheduling PI(DF) controller, provided that the dissociation constants and the other parameters remain fixed. A more general adaptive strategy that can compensate for wider classes of uncertainty is also feasible.

It is expected that uniform performance can be achieved by using one of the following nonlinear controller schemes:

Gain Scheduling: This involves the design of different controllers for different operating points. The scheduling of the controllers is based on independent measurements that determine the operating point.

Nonlinear Model Predictive Controller: This involves the identification of full nonlinear plants, such as the Hammerstein model mentioned above. The Control input is chosen such that it minimizes a suitable error (such as setpoint tracking) for a given prediction horizon. Details of this method can be found in MarArthur.

Adaptive PID: This scheme involves adaptation of the PID gains during operation such that the loop transfer function approximates a target. It is of particular interest here since the effective variability can be attributed to a single parameter, which can be estimated reliably with very modest excitation requirements. Details of this method can be found in Tsakalis et al., "Approximate H∞ loop shaping in PID parameter adaptation," Int. J. Adapt. Control Signal Process, vol. 27, issue 1-2, 2013 (which is hereby incorporated by reference in its entirety).

In summary, a procedure has been described for system analysis and controller design. Its application to a pH neutralization process model has been presented to illustrate the sequence of computations and the capabilities for various design choices. The complete design of a PI (or PID) controller for the pH control problem has been outlined with a data-driven model. In this case, this procedure is very attractive since it offers a systematic approach for the determination of various design parameters, such as closed-loop bandwidth. The first-principles and data-driven approaches have a fairly similar treatment under the frequency loop-shaping objectives. In fact, they also complement certain aspects of each other, such as when model order and structure can be inferred by analyzing a first-principles model while uncertainty and model-reduction constraints on bandwidth selection can be efficiently determined with tools from data-driven modeling. Finally, the significant performance deterioration observed with a single linear controller supports the consideration of nonlinear analysis both for modeling and control. An overview of different nonlinear modeling and controller design approaches has been presented, and the feasibility of obtaining uniform performance in a wide range of operating conditions has been justified.

Note that the techniques for robust control design described here are in no way limited to use with PI (or PID) controllers or to use with a pH process. The techniques described here can be used with any suitable types of controllers and with any suitable types of industrial processes. Also, the robust control design techniques can be used with any suitable types of process models used to control an industrial process. While sometimes described above as using Hammerstein models (also known as NL models), other example types of models could include Weiner models (also known as LN models) or full Non-linear Linear Non-Linear models (also known as NLN models).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   determining, by at least one processing device, a process model representing an industrial process, wherein determining the process model includes:
   using first-principal modeling to determine a model structure for the process model representing the industrial process;
   establishing one or more identification experiments for the determined model structure;
   retrieving empirical data collected while running the established one or more identification experiments;
   generating an empirical model having the model structure using the collected empirical data;
   obtaining, by the at least one processing device, controller specifications for an industrial process controller, wherein obtaining the controller specifications includes:
   obtaining one or more control objectives for the industrial process from a user;
   wherein the one or more control objectives quantify one or more desired performance characteristics of the industrial process controller and its robustness constraints due to uncertainty;
   identifying the uncertainty as a multiplicative uncertainty with the process model, where the multiplicative uncertainty defines an error between an output of the process model and an output of the industrial process as a percentage of the output of the process model;
   identifying a controller design comprising one or more parameters for the industrial process controller using the process model, the uncertainty and the one or more parameters;
   validating, by the least one processing device, the controller design of the industrial process controller in both a frequency domain and in a time domain, wherein:
   the frequency domain validation comprises verification of a small-gain robust stability condition for the uncertainty of the process model; and
   the time domain validation comprises analyzing step responses to setpoint changes and disturbances; and
   deploying, by the at least one processing device, the controller design to the industrial process controller such that the industrial process controller subsequently uses the controller design in controlling the industrial process.

2. The method of claim 1, wherein the one or more control objectives are expressed as an optimization problem.

3. The method of claim 1, wherein:
   the industrial process comprises a pH neutralization process;
   the controller design of the industrial process controller is configured to cause the industrial process controller to control a pH of one or more materials in the pH neutralization process; and
   determining the process model comprises obtaining a nominal process model and linearizing the nominal process model at different pH values to identify multiple transfer functions, the transfer functions having similar time constants and different steady-state gains.

4. The method of claim 3, wherein:
   validating the controller design comprises simulating operation of the industrial process controller using each transfer function as a model of the industrial process; and
   for each transfer function, the operation of the industrial process controller is simulated assuming the pH of the one or more materials is at a different value than the pH value used to generate that transfer function.

5. The method of claim 4, wherein the nominal process model comprises a nonlinear process model generated using (i) mass-balance and charge-balance equations for the pH neutralization process and (ii) a relationship between reaction invariants and pH for the pH neutralization process.

6. The method of claim 4, further comprising:
designing an adaptive or nonlinear controller using the transfer functions.

7. The method of claim 1, wherein the industrial process controller comprises a multivariable controller, a proportional-integral (PI) controller, a proportional-integral-derivative (PID) controller, or a microcontroller.

8. An apparatus for a controller design of an industrial process controller for use in controlling an industrial process, comprising:
at least one memory storing a process model representing the industrial process; and
at least one processing device configured to:
determine, by at least one processing device, a process model representing an industrial process, wherein obtaining the process model includes:
using first-principal modeling to determine a model structure
establishing one or more identification experiments for the determined model structure;
retrieving empirical data collected while running the established one or more identification experiments; and
generating an empirical model having the model structure using the collected empirical data;
obtain, by the at least one processing device, controller specifications for an industrial process controller, wherein obtaining the controller specifications includes:
obtaining one or more control objectives for the industrial process;
wherein the one or more control objectives quantify one or more desired performance characteristics of the industrial process controller and its robustness constraints due to uncertainty;
identifying the uncertainty as a multiplicative uncertainty with the process model, where the multiplicative uncertainty defines an error between an output of the process model and an output of the industrial process as a percentage of the output of the process model;
identifying a controller design comprising one or more parameters for the industrial process controller using the process model, the uncertainty and the one or more parameters;
validating, by the least one processing device, the controller design of the industrial process controller in both a frequency domain and in a time domain, where:
the frequency domain validation comprises verification of a small-gain robust stability condition for the uncertainty of the process model; and
the time domain validation comprises analyzing step responses to setpoint changes and disturbances; and
deploying, by the at least one processing device, the controller design to the industrial process controller such that the industrial process controller subsequently uses the controller design in controlling the industrial process.

9. The apparatus of claim 8, wherein the one or more control objectives are expressed as an optimization problem.

10. The apparatus of claim 8, wherein:
the industrial process comprises a pH neutralization process;
the controller design of the industrial process controller is configured to cause the industrial process controller to control a pH of one or more materials in the pH neutralization process; and
the at least one processing device is further configured to obtain a nominal process model and linearize the nominal process model at different pH values to identify multiple transfer functions, the transfer functions having similar time constants and different steady state gains.

11. The apparatus of claim 10, wherein:
the at least one processing device is configured to validate the controller design by simulating operation of the industrial process controller using each transfer function as a model of the industrial process; and
the at least one processing device is configured, for each transfer function, to simulate the operation of the industrial process controller assuming the pH of the one or more materials is at a different value than the pH value used to generate that transfer function.

12. The apparatus of claim 8, wherein the at least one processing device is configured to deploy the validated controller design to a multivariable controller, a proportional-integral (PI) controller, a proportional-integral-derivative (PID) controller, or a microcontroller.

13. A non-transitory computer readable medium containing instructions, for a controller design of an industrial process controller used in an industrial process, that when executed cause at least one processing device to:
generate a process model representing an industrial process, wherein determining the process model includes:
using first-principal modeling to determine a model structure for the process model representing the industrial process;
establishing one or more identification experiments for the determined model structure;
retrieving empirical data collected while running the established one or more identification experiments;
generating an empirical model having the model structure using the collected empirical data;
obtaining controller specifications for an industrial process controller, wherein obtaining the controller specifications includes:
obtaining one or more control objectives for the industrial process from a user;
wherein the one or more control objectives quantify one or more desired performance characteristics of the industrial process controller and its robustness constraints due to uncertainty;
identifying the uncertainty as a multiplicative uncertainty with the process model, where the multiplicative uncertainty defines an error between an output of the process model and an output of the industrial process as a percentage of the output of the process model;
identifying a controller design comprising one or more parameters for the industrial process controller using the process model, the uncertainty and the one or more parameters;
validating the controller design of the industrial process controller in one or both of a frequency domain and a time domain, wherein:
the frequency domain validation comprises verification of a small-gain robust stability condition for the uncertainty of the process model; and
the time domain validation comprises analyzing step responses to setpoint changes and disturbances; and deploying, by the at least one processing device, the controller design to the industrial process controller such that the industrial process controller subsequently uses the controller design in controlling the industrial process.

14. The non-transitory computer readable medium of claim 13, wherein:
the industrial process comprises a pH neutralization process;
the controller design of the industrial process controller is configured to cause the industrial process controller to control a pH of one or more materials in the pH neutralization process; and
the instructions that when executed cause the at least one processing device to generate the process model comprise instructions that when executed cause the at least one processing device to obtain a nominal process model and linearize the nominal process model at different pH values to identify multiple transfer functions, the transfer functions having similar time constants and different steady-state gains.

15. The non-transitory computer readable medium of claim 14, wherein:
the instructions that when executed cause the at least one processing device to validate the controller design comprise instructions that when executed cause the at least one processing device to simulate operation of the industrial process controller using each transfer function as a model of the industrial process; and
for each transfer function, the operation of the industrial process controller is simulated assuming the pH of the one or more materials is at a different value than the pH value used to generate that transfer function.

16. The non-transitory computer readable medium of claim 13, wherein the instructions further comprise instructions to:
identify the uncertainty as a multiplicative uncertainty associated with the process model;
wherein the multiplicative uncertainty defines an error between an output of the process model and an output of the industrial process as a percentage of the output of the process model.

17. The non-transitory computer readable medium of claim 13, wherein the one or more control objectives are expressed as an optimization problem.

* * * * *